(12) United States Patent
Song et al.

(10) Patent No.: US 12,716,220 B2
(45) Date of Patent: Aug. 25, 2026

(54) DEVICE AND METHOD FOR CONTROLLING FAUCET, AND FAUCET

(71) Applicant: THE SL CO., LTD., Seoul (KR)

(72) Inventors: Kyeong Keun Song, Seongnam-si (KR); Jong-Geun Lim, Seoul (KR)

(73) Assignee: THE SL CO., LTD., Seoul (KR)

( * ) Notice: Subject to any disclaimer, the term of this patent is extended or adjusted under 35 U.S.C. 154(b) by 143 days.

(21) Appl. No.: 18/686,295

(22) PCT Filed: Aug. 18, 2022

(86) PCT No.: PCT/KR2022/012331
§ 371 (c)(1),
(2) Date: Feb. 23, 2024

(87) PCT Pub. No.: WO2023/027415
PCT Pub. Date: Mar. 2, 2023

(65) Prior Publication Data

US 2024/0360654 A1 Oct. 31, 2024

(30) Foreign Application Priority Data

Aug. 23, 2021 (KR) ........................ 10-2021-0111137

(51) Int. Cl.

| | |
|---|---|
| ***E03C 1/044*** | (2006.01) |
| ***E03C 1/05*** | (2006.01) |
| *F16K 11/00* | (2006.01) |

(52) U.S. Cl.
CPC .............. *E03C 1/044* (2013.01); *E03C 1/055* (2013.01); *E03C 1/057* (2013.01); *F16K 19/006* (2013.01)

(58) Field of Classification Search
CPC .......... E03C 1/044; E03C 1/057; E03C 1/055; F16K 19/006
See application file for complete search history.

(56) References Cited

U.S. PATENT DOCUMENTS 4,756,030 A * 7/1988 Juliver .................... E03C 1/055 4/677
6,446,875 B1 * 9/2002 Brooks ..................... E03C 1/05 236/12.12

(Continued)

FOREIGN PATENT DOCUMENTS

JP 2009079360 A * 4/2009
JP 2015190204 A 11/2015

(Continued)

*Primary Examiner* — David Colon-Morales
(74) *Attorney, Agent, or Firm* — WILLIAM PARK AND ASSOCIATES LTD.

(57) ABSTRACT

A device for controlling a faucet has a first and a second temperature sensors measuring temperatures of hot water and cold water, respectively, a heating tank heating the hot water supplied from a hot water pipe with a heater, a third temperature sensor measuring a temperature of the heated water, an electronic valve selecting two among the heated hot water, the cold water, and the hot water as a mixture target supply water based on the temperature of hot water and a desired temperature set by a user, and discharging discharge water at a temperature corresponding to the desired temperature by controlling a mixing ratio of the mixture target supply water, a fourth temperature sensor measuring the temperature of the discharge water, a flow rate sensor measuring a flow rate of the discharge water, and a controller controlling the drive of the heater and the electric valve.

11 Claims, 12 Drawing Sheets

(56) References Cited

U.S. PATENT DOCUMENTS 7,190,894 B2 * 3/2007 Chamberlain, Jr. .... F24H 1/102 392/488
8,438,672 B2 * 5/2013 Reeder .................... E03C 1/055 4/668
10,323,859 B2 * 6/2019 Alsadah ................ F24H 15/223
10,519,633 B2 * 12/2019 Adelman ................ F16K 31/50
10,640,393 B2 * 5/2020 Cobb .................... E03C 1/0411
10,760,819 B2 * 9/2020 Yuan .................. G05D 23/1393
12,091,845 B2 * 9/2024 Song ....................... E03C 1/041
2003/0213850 A1 * 11/2003 Mayer ................ G05D 23/1393 236/12.12
2006/0138246 A1 * 6/2006 Stowe ....................... E03C 1/05 236/12.12
2007/0152074 A1 * 7/2007 Stowe ..................... E03C 1/266 236/12.1
2011/0088799 A1 * 4/2011 Jung ..................... F16K 27/048 137/607
2013/0239321 A1 9/2013 Reeder et al.
2014/0069516 A1 * 3/2014 Shapira ................... E03C 1/055 137/88
2020/0356124 A1 * 11/2020 Bresson ................ E03C 1/0412

FOREIGN PATENT DOCUMENTS

KR 100706105 B1 4/2007
KR 101742568 B1 5/2017
KR 20180002626 U * 9/2018 ........... G05D 7/0635
KR 101986942 B1 6/2019
KR 1020200137488 A 12/2020
KR 1020210077622 A 6/2021
KR 102377123 B1 3/2022
WO WO-2019194601 A1 * 10/2019 ........... E03C 1/0412
WO 2020227623 A1 11/2020
WO 2021125750 A1 6/2021

* cited by examiner

FIG. 1

Shower head
Faucet knob
3
2
2a
120b
140
160
120d
Controller (170)
100
150
155
120c
Push button
110
130
180
120a
1a
1

Figure 11:
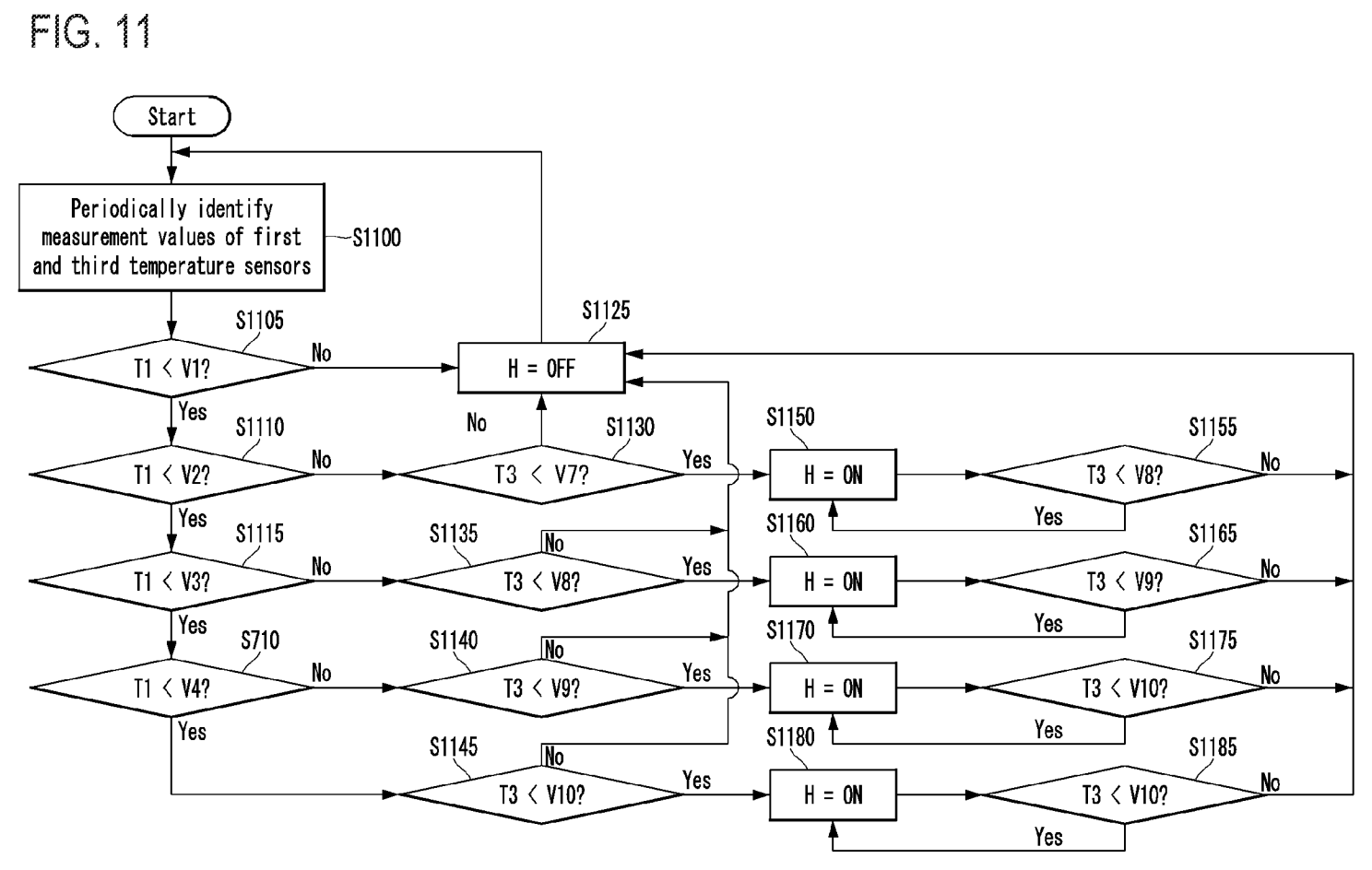

Start

Periodically identify measurement values of first and third temperature sensors

S1100

S1105

T1 < V1?

S1110

T1 < V2?

S1115

T1 < V3?

S710

T1 < V4?

Yes

No

S1125

H = OFF

S1130

T3 < V7?

S1135

T3 < V8?

S1140

T3 < V9?

S1145

T3 < V10?

S1150

H = ON

S1160

H = ON

S1170

H = ON

S1180

H = ON

S1155

T3 < V8?

S1165

T3 < V9?

S1175

T3 < V10?

S1185

T3 < V10?

DEVICE AND METHOD FOR CONTROLLING FAUCET, AND FAUCET

TECHNICAL FIELD

The present invention relates to a device and method for controlling a faucet that can automatically adjust temperature, and a faucet.

BACKGROUND ART

Faucets that are installed in a sink, a washstand, etc. are composed of a body configured to be supplied with cold water and hot water through cold water and hot water pipelines, and a lever installed on the body to supply or interrupt water and select cold water and hot water. When a user holds and turns or moves up/down a lever, it is possible to block or supply water and also control the temperature of water that is supplied. When the amount of water is controlled by opening/closing a lever and both hot water and cold water come out from one faucet, the temperature of water is adjusted by adjusting the rotation angle of the lever.

In an individual supply system, a temperature of hot water that is supplied through a faucet is influenced by the state of a boiler. For example, when the hot water is secured by sufficiently operating the boiler, hot water is supplied simultaneously with operating the faucet, however, when the boiler is just operated, the cold water is supplied at the early stage and a predetermined temperature is reached while the amount of the hot water gradually increases. Meanwhile, a central supply system is influenced by the distance from a hot water supplier to a hot water consumer, external temperature, water pressure, whether hot water is used by neighboring households, etc.

Further, when the internal temperature of a hot water hydrant is not uniform, high-temperature water is suddenly supplied through the faucet or the temperature of water changes while the hot water is supplied in some cases. Such a rapid change of the temperature of the hot water may cause a burn on a skin due to high-temperature hot water, and a rapid drop of the temperature of water may cause a user's inconvenience. Furthermore, there is a problem in that the temperature of water changes even when the supply water pressure of the hot water changes.

In relation to this, a faucet that can automatically adjust temperature and an apparatus and a method of controlling the faucet have been disclosed in Korean Patent No. 10-1986942. However, there is limitation in that the faucet disclosed in the patent can perform target operation in an environment in which electric power is sufficiently supplied. That is, when the maximum electric power allowed for an electric product for home use is about 3 Kw, as in Korean, it is possible to increase temperature by about 12° C. when heating water of 50 mℓ for 1 second with a heater. When hot water temperature in a hot water pipe decreases to 20° C. in this situation, it is possible to increase the hot water temperature up to 32° C. for 1 second even if controlling a valve such that hot water is discharged by 50 mℓ per second from the hot water pipe. This temperature is considerably lower than the desired temperature of a user, so it is difficult to achieve the target expected from the faucet.

DISCLOSURE

Technical Problem

It is an object of the present invention to provide a device and method for controlling a faucet that can automatically adjust temperature.

In addition, it is an object of the present invention to provide a device and method for controlling a faucet that can supply hot water at temperature desired by a user immediately after the user uses a faucet even if hot water in a hot water pipe is cold.

In addition, it is an object of the present invention to provide a device and method for controlling a faucet that can automatically adjust temperature to keep a discharge temperature constant even if the supply water pressure of hot water or cold water changes.

In addition, it is an object of the present invention to provide a faucet that can automatically adjust temperature to keep a discharge temperature constant even if the supply water pressure of hot water or cold water changes.

Technical Solution

According to an aspect of the present invention, a device for controlling a faucet capable of automatically controlling a temperature.

According to an embodiment of the present invention, the device for controlling a faucet includes an input means for setting a desired temperature of discharge water from a user; a first temperature sensor and a second temperature sensor measuring temperatures of hot water and cold water supplied from the hot water pipe and the cold water pipe, respectively; a heating tank heating the hot water supplied from the hot water pipe by a heater provided therein, and keeping the heated hot water, and supplying the heated hot water when a user uses a faucet; a third temperature sensor measuring a temperature of water in the heating tank; a hot water direct supplying pipe supplying the hot water supplied from the hot water pipe to the faucet; an electronic valve selecting two of the heated hot water supplied from the heating tank, the hot water supplied from the hot water direct supplying pipe, and the cold water supplied from the cold water pipe as mixture target supply water, and discharging discharge water in a desired temperature by the user through a discharge pipe by controlling a mixing ratio of the selected mixture target supply water; a fourth temperature sensor measuring the temperature of the discharge water discharged from the electronic valve; a flow rate sensor installed in a discharge pipe of the electronic valve and measuring a flow rate of the discharge water; and a controller controlling whether to drive the heater provided in the heating tank based on the temperature of the water in the heating tank, and controlling a difference between the temperature of the discharge water and the desired temperature of the discharge water set by the user to be lower than or equal to a predetermined reference temperature by repeatedly performing an operation of controlling the electronic valve so as to re-adjust the mixing ratio of the selected mixture target supply water based on the temperature of the discharge water measured by the fourth temperature sensor and the desired temperature of the discharge water set by the user, or reselect the mixture target supply water, and then adjust a mixing ratio of the reselected mixture target supply water.

Preferably, the device for controlling a faucet includes: an input pipe connected to the discharge pipe of the electronic valve, and input with the discharge water; and at least two discharge pipes, and the device further includes a second electronic valve outputting the discharge water input from the input pipe to a discharge pipe selected among at least two discharge pipes by the control of the controller.

Preferably, the electronic valve includes a motor rotated according to a control signal input from the controller; and a cartridge, wherein the cartridge includes a rotational shaft rotated in connection to a driving shaft of the motor; a first inflow pipe connected to the hot water direct supplying pipe, and input with hot water; a second inflow pipe connected to the heating tank and input with heated hot water; a third inflow pipe connected to the cold water pipe and input with cold water; a rotation plate rotated in connection to the rotational shaft and having through-holes; and a discharge pipe discharging the discharge water, and the cartridge mixes mixture target supply water supplied from two inflow pipes selected among the first inflow pipe, the second inflow pipe, and the third inflow pipe according to a rotational amount of the rotation plate, and discharges the mixed supply water through the discharge pipe.

Preferably, the controller controls the electronic valve to be rotated by a first angle when a difference between the temperature of the discharge water measured by the fourth temperature sensor and the desired temperature of the user is higher than or equal to a first reference temperature, controls the electronic valve to be rotated by a second angle when the difference between the temperature of the discharge water measured by the fourth temperature sensor and the desired temperature of the user is lower than the first reference temperature and higher than or equal to a second reference temperature, and controls the electronic valve to be rotated by a third angle when the difference between the temperature of the discharge water measured by the fourth temperature sensor and the desired temperature of the user is lower than the second reference temperature and higher than or equal to a third reference temperature, wherein the first angle is set to be larger than the second angle, and the second angle is set to be larger than the third angle, and when the temperature of the discharge water is higher than the desired temperature of the user, the controller controls the electronic valve to be rotated in a direction to increase the amount of water having a low temperature, and when the temperature of the discharge water is lower than the desired temperature of the user, the controller controls the electronic valve to be rotated in a direction to increase the amount of water having a high temperature.

Preferably, the cartridge mixes mixture target supply water supplied from the first inflow pipe and the second inflow pipe according to the rotational amount of the rotation plate, and discharges the mixed supply water, or mixes mixture target supply water supplied from the second inflow pipe and the third inflow pipe, and discharges the mixed supply water through the discharge pipe.

Preferably, the cartridge mixes mixture target supply water supplied from the first inflow pipe and the second inflow pipe according to the rotational amount of the rotation plate, and discharges the mixed supply water, or mixes mixture target supply water supplied from the first inflow pipe and the third inflow pipe, and discharges the mixed supply water through the discharge pipe.

Preferably, the controller determines a target heating temperature of the hot water in the heating tank based on a measurement value of the first temperature sensor and a measurement value of the third temperature sensor, and drives the heater until the temperature of the hot water in the heating tank reaches the target heating temperature.

Preferably, the target heating temperature is lower than or equal to a maximum heating temperature set with respect to the hot water in the heating tank.

Preferably, the controller performs a determination operation of the target heating temperature of the hot water and a driving operation of the heater based on the measurement value of the first temperature sensor and the third temperature sensor at a predetermined time interval.

Preferably, the input means is a communication module that receives the input of desired temperature of the discharge water from a hand-held terminal device of the user through a communication network.

Advantageous Effects

A device and a method for controlling a faucet that can automatically adjust temperature, and a faucet, according to an embodiment of the present invention are provided, so that it is possible to automatically adjust a discharged temperature to be constantly maintained even if supply water pressure of hot water or cold water is changed. Further, even when the hot water in a hot water pipe is cold, hot water at temperature desired by a user can be supplied immediately after the user uses the faucet.

DESCRIPTION OF DRAWINGS

FIG. 1 is a diagram illustrating a configuration of a device for controlling a faucet according to an embodiment of the present invention, FIG. 11 is a diagram illustrating an example of a driving method of a heater 155 by a controller 170 based on measurement values of a first temperature sensor **120*a* and a third temperature sensor 120*c* when a faucet 3 is not used.

BEST MODE

Figure 2:
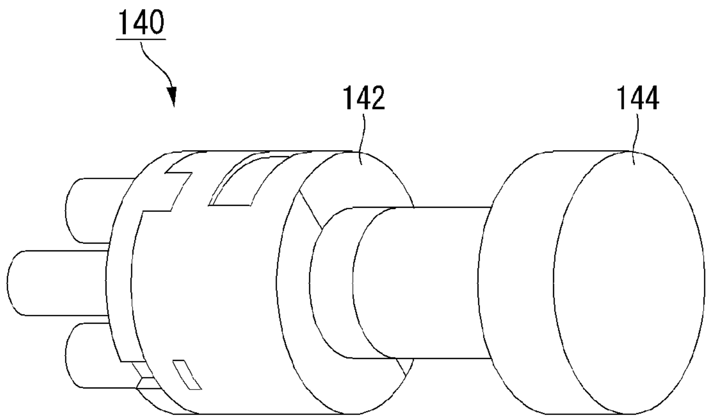
FIG. 2 is a diagram illustrating a configuration of an electronic valve 140.

A singular form used in the present specification includes a plural form unless the context clearly dictates otherwise. In the present specification, a term such as "comprise" or "include" should not be interpreted as necessarily including all various components or various steps described in the present specification, and it should be interpreted that some components or some steps among them may not be included or additional components or steps may be further included. In addition, the terms including " . . . part', "module", and the like described in the specification mean a unit that processes at least one function or operation and this may be implemented by hardware or software or a combination of hardware and software. Hereinafter, preferred embodiments of the present invention will be described in detail with reference to the accompanying drawings.

Figure 1:
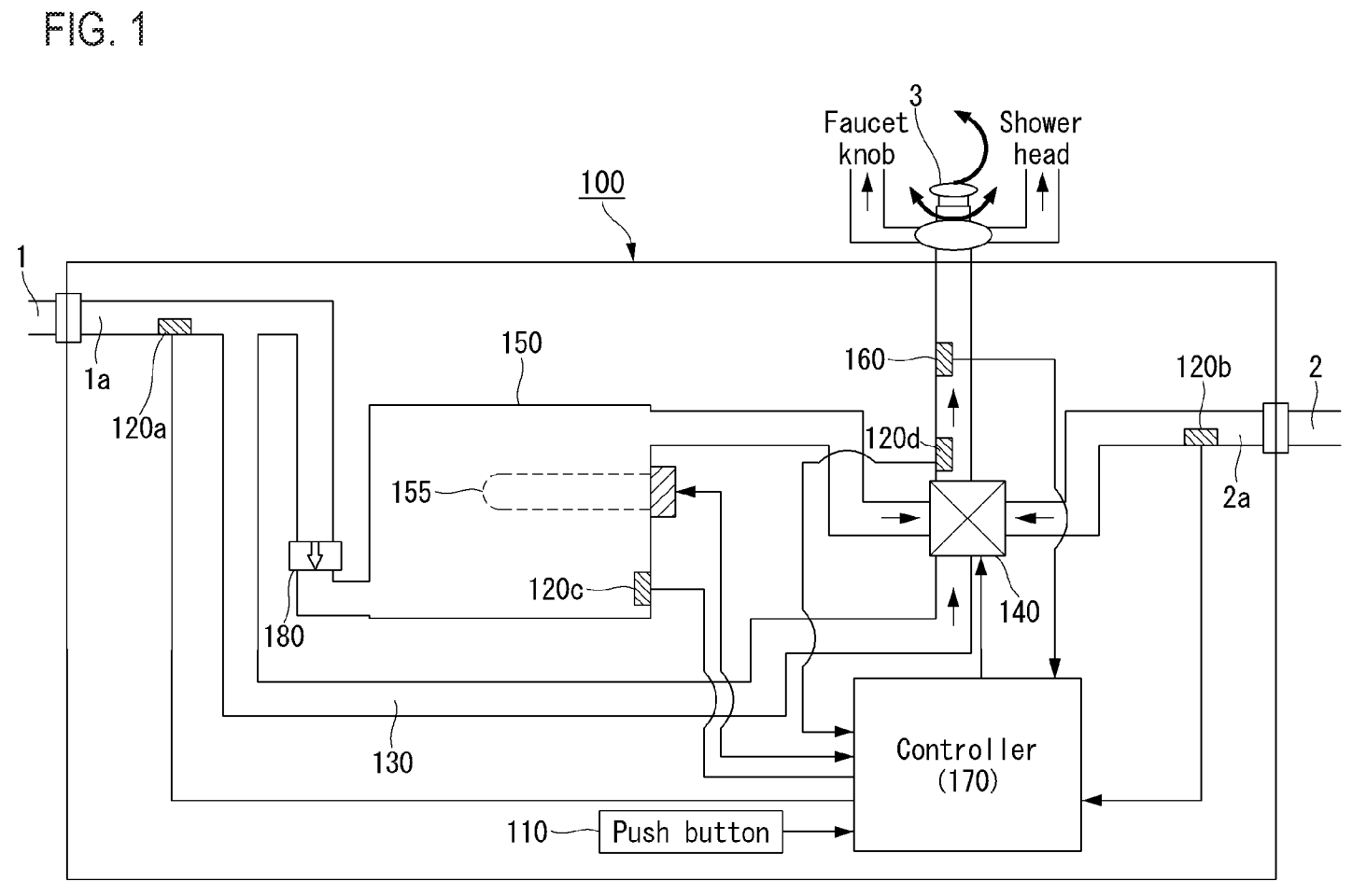

FIG. 1 is a diagram illustrating a configuration of a device for controlling a faucet according to an embodiment of the present invention.

Referring to FIG. 1, a device 100 for controlling a faucet according to an embodiment of the present invention includes a hot water connection pipe 1*a*, a cold water connection pipe 2*a*, a temperature setting means 110, a plurality of temperature sensors 120*a* to 120*d*, a hot water direct supplying pipe 130, an electronic valve 140, a heating tank 150, a flow rate sensor 160, and a controller 170.

The temperature setting means 110 is a component that is set with a desired temperature of discharge water from a user. The temperature setting means 110 illustrated in FIG. 1 may be implemented as a push button. In this case, the push button is constituted by a button for increasing a temperature and a button for decreasing the temperature. A desired temperature preset in in the device 100 for controlling a faucet and a desired temperature which is increased and decreased as the button is pushed by a user may be output to a separate display device (not illustrated) or output through a speaker (not illustrated). A menu button for identifying a state of a device may be additionally provided in addition to the buttons for increasing and decreasing the temperature. In this case, the user may select an identification function of the amount of used water, a user-specific preferred temperature setting function, etc., by using the menu button and the temperature increase and decrease button. Furthermore, a state of the device 100 for controlling a faucet corresponding to the display device is displayed by operating the menu button. In addition, an error code corresponding to a malfunction or failure of the device 100 for controlling a faucet may be displayed on the display device.

When the temperature setting means 110 is implemented as the push button as described above, the faucet may be opened and closed by using a separate knob. As an example, when a direction switching cartridge is installed at a water outlet end of the electronic valve 140, and a knob connected to the direction switching cartridge is positioned at an intermediate location (6 o'clock direction), discharge of the discharge water is interrupted. In addition, when the knob is rotated in a clockwise direction from the intermediate location, the discharge water is discharged to a bathtub or a washstand, and as a rotational amount in the clockwise direction increases, a discharge amount of the discharge water increases. In addition, when the knob is rotated in a counterclockwise direction from the intermediate location, the discharge water is discharged through a shower head, and as a rotational amount in the counterclockwise direction increases, the discharge amount of the discharge water increases. Furthermore, opening and closing the faucet may also be performed by separately installing an electronic valve (not illustrated). In this case, the separate electronic valve is connected to the direction switching cartridge to adjust a discharge direction of the discharge water and a water amount of the discharge water.

Meanwhile, the temperature setting means 110 may be configured by a rotation sensor coupled to a knob 3 of a general faucet. This rotation sensor may be set with a temperature of the discharge water desired by the user by detecting a horizontal rotation amount of the faucet knob 3. As for the horizontal rotation amount of the faucet knob 3, it is assumed that an angle when the faucet knob 3 rotates at a leftmost side is set to 0° and an angle when the faucet knob 3 rotates at a rightmost side is set to $\theta_{Hmax}$°. In this case, when the faucet knob 3 is positioned at the center, the angel of the faucet knob 3 is equal to $0.5\theta_{Hmax}$°. That is, when a horizontal rotation angle of the faucet knob 3 is 0° to 90°, the angle becomes 45° when the faucet knob 3 is positioned at the center. In this case, a temperature of the discharge water corresponding to the horizontal rotation amount of each faucet knob may be appropriately set as needed. In the following table, examples of setting the temperature of the discharge water according to the horizontal rotation angle of the faucet knob 3 are described.

TABLE 1

| Angle (°) | 0 | 5 | 10 | 15 | 20 | 25 | 30 | 35 | 40 | 45 |
|---|---|---|---|---|---|---|---|---|---|---|
| Temperature (° C.) | 18 or less | 19.5 | 21 | 22.5 | 24 | 25.5 | 27 | 28.5 | 30 | 31.5 |

| Angle (°) | 50 | 55 | 60 | 65 | 70 | 75 | 80 | 85 | 90 |
|---|---|---|---|---|---|---|---|---|---|
| Temperature (° C.) | 33 | 34.5 | 36 | 37.5 | 39 | 40.5 | 42 | 43.5 | 45 or more |

Discharge water temperatures when the horizontal rotation angle of the faucet knob 3 is 0° and 90° may be set to a lowest temperature of cold water and a highest temperature of hot water which are supplied, respectively, and may also be set by dividing a difference value between the highest temperature of the hot water and the lowest temperature of the cold water by the number of horizontal rotation angle intervals (e.g., 2°, 5°, etc.) of the faucet knob 3 and corresponding an increase value of the temperature according to the horizontal rotation angle interval of the faucet knob 3.

When the desired temperature of the discharge water is set by using the horizontal rotation angle of the faucet knob 3 as described above, a desired water amount of the discharge water may be set based on a vertical rotation angle of the faucet knob 3. That is, as for a vertical rotation amount of the faucet knob 3, an angle when the faucet knob 3 is positioned at a lowermost end is set to 0° and an angle when the faucet knob 3 is positioned at an uppermost end (top) is set to $\theta_{Vmax}$°. For example, the vertical rotation amount of the faucet knob 3 may be set to a range of 0° to 45°. In this case, the water amount of the discharge water may be set according to the vertical rotation amount of the faucet knob 3.

In such a configuration, the device 100 for controlling a faucet may detect a stop location of the faucet knob 3 based on a previous stop location (horizontal and vertical rotation amounts at a previous operation end time) the faucet knob 3 and a current movement amount (horizontal and vertical rotation amounts) of the faucet knob 3. However, when the stop location is calculated based on the previous stop location and the current movement amount of the faucet knob 3, there is a problem in that an error gradually increases as time elapses. Therefore, the device 100 for controlling a faucet sets an intermediate angle ($0.5\theta_{Hmax}$°) of the horizontal rotation angle of the faucet knob 3 as a horizontal reference angle, and sets the vertical rotation angle of 0° which is a state in which the faucet knob 3 is positioned at the lowermost end as a vertical reference angle, and then initializes a movement amount of the faucet knob when the faucet knob 3 is positioned at the horizontal reference angle and the vertical reference angle. In addition, a current rotation amount of the faucet knob 3 is calculated by measuring the vertical and horizontal rotation amounts of the faucet knob 3 based on the initialized movement amount of the faucet knob 3 to minimize the error.

Further, the device 100 for controlling a faucet may determine, as a final location, a stop location detected at the time when a predetermined time (e.g., 1 second) has elapsed from the time when the faucet knob 3 stops.

As described above, the device 100 for controlling a faucet measures the horizontal rotation angle and the vertical rotation angle of the faucet knob 3 to calculate the temperature and the water amount of the discharge water desired by the user.

Meanwhile, various types of input devices may be used as the temperature setting means 110. As an example, when a hot water knob and a cold water knob are separated, rotational amounts of the hot water knob and the cold water knob may be measured to identify the temperature and the water amount of the discharge water desired by the user. Further, the desired temperature and water amount may be input through the touch panel by the user, and when a communication module is mounted on the device 100 for controlling a faucet, the desired temperature and water amount may also be input through a smartphone, a wireless controller, etc., by the user.

When the smartphone is to be used as the input device, an application for controlling the device 100 for controlling a faucet according to the present invention is preferably installed in the smartphone. According to selection of the user or a setting state, a cold water temperature, a hot water temperature, a cold water amount, a hot water amount, a discharge water temperature, a discharge water amount, etc., are selectively displayed in an output device of a control panel. Further, the input device of the control panel may have a type such as a touch screen, a voice recognition device, a button input device, etc. In this case, the device 100 for controlling a faucet according to the present invention may include a communication unit for transmitting and receiving data to and from the input device and the output device, and a device capable of wired and wireless communication including a Bluetooth module, a Wi-Fi module, etc. may be adopted as the communication unit.

The temperature sensors 120*a* to 120*da* are installed between a hot water connection pipe 1*a*, a cold water connection pipe 2*a*, a heating tank 150 and the electronic valve 140, and the faucet, respectively.

A first temperature sensor 120*a* is installed near a hot water inflow point of the hot water connection pipe 1*a* which is connected to a hot water pipe 1 into which the hot water flows to measure a temperature of hot water supplied through the hot water pipe 1. Further, a second temperature sensor 120*b* is installed near a cold water inflow point of the cold water connection pipe 2*a* which is connected to a cold water pipe 2 into which the cold water flows to measure a temperature of cold water supplied through the cold water pipe 2. The hot water temperature and the cold water temperature measured by the first temperature sensor 120*a* and the second temperature sensor 120*b* are output to the controller 170.

A third temperature sensor 120*c* measures a temperature of water in the heating tank 150. The heating tank 150 includes a heater 155 therein to heat and keep the hot water supplied from the hot water pipe 1. That is, while the faucet does not operate (the user does not use water), the heater 155 which is installed inside the heating tank 150 is driven to heat water inside the heating tank 150 at a preset first temperature (e.g., 60° C.). When the temperature of the water inside the heating tank 150 reaches a first temperature, the controller 170 stops an operation of the heater 155. In such a state, when the temperature of the water inside the heating tank 150 decreases to a preset second temperature (e.g., 40° C.), the controller 170 drives the heater 155 again to repeat the operation of heating the water inside the heating tank 150 at the preset first temperature. The first temperature and the second temperature are determined by a water amount of hot water remaining in a pipe to the faucet 3 from an initial inflow point (a point branched to each house from a central pipe when hot water is supplied by a District Heating Corporation and a hot water discharge point of a boiler installed in the house) of hot water, a supply temperature of the hot water, a capacity of the heating tank 150, water amounts of hot water and cold water, a capacity of the heater 155, etc. In this case, it is advantageous to set the first temperature to a temperature as high as possible in order to ensure the desired temperature of the discharge water, but it is preferable to set the first temperature to 80° C. or less if possible considering a possibility that the user gets burned, a heat resistance performance of the heating tank 150, etc. Meanwhile, it is illustrated in FIG. 1 that only one heater is mounted in the heating tank 150, but a plurality of heaters may also be mounted in the heating tank 150.

The heater 155 installed in the heating tank 150 may be controlled to be driven even when the faucet operates, and whether the heater 155 is driven may be determined by the water amount of hot water remaining in the pipe to the faucet 3 from the initial inflow point of hot water, the supply temperature of hot water, the supply temperature of cold water, the capacity of the heating tank 150, the desired temperature and water amount of the discharge water set by the user, the water amounts of the hot water and the cold water, the capacity of the heater 155, etc. Furthermore, the capacity of the heater 155 may be basically determined by the capacity of the heating tank 150 and the supply temperature of the hot water. For example, when the capacity of the heating tank 150 is 1 L, the capacity of the heater 155 may be approximately 1 KW in order to heat hot water at 20° C. for 5 minutes and increase the temperature of the hot water to 80° C. The heated hot water is kept in the heating tank 150, and the controller 170 controls the electronic valve 140 in response to the operation of the faucet 3 by the user to mix the heated hot water discharged from the heating tank 140 with the cold water or hot water until the hot water supplied from the hot water pipe 1 reaches a first reference temperature (e.g., 42° C.), and supply the mixed water to the faucet 3.

The electronic valve 140 closes a pipe connected to the heating tank 150 in order to prevent heat of the heated hot water in the heating tank 150 from being transferred to the cold water pipe 2 and the hot water direct supplying pipe 130 when the faucet 3 is not used, and is driven to a location which is in communication with any one (preferably, the pipe connected to the hot water direct supplying pipe 130) among the pipes connected to the cold water pipe 2 and the hot water direct supplying pipe 130. In addition, the electronic valve 140 is controlled so that the temperature of the discharge water becomes the desired temperature of the discharge water set by the user by adjusting an opening ratio of two pipes selected among three pipes connected to the electronic valve 140 based on the desired temperature of the discharge water set by the user, the temperature of the heated hot water in the heating tank 150, the temperature of the hot water supplied through the hot water pipe 1, and the temperature of the cold water supplied through the cold water pipe 2 at the time when the faucet 3 is used.

Meanwhile, an inner diameter of a pipe branched from the hot water connection pipe 1*a* to the heating tank 150 and an inner diameter of a pipe branched from the hot water connection pipe 1*a* to the hot water direct supplying pipe 130 are appropriately determined to set a distribution ratio of hot water. In this case, a distribution ratio of hot water flowing in from the hot water pipe 1 to the heating tank 150 and the hot water direct supplying pipe 130 is preferably set to 1:1, and may be set in a range of 1:1 to 1:4 as needed. In this case, a direction control valve 180 is preferably installed at a hot water inlet of the heating tank 150, which allows hot water to flow only to the heating tank 150 from the hot water pipe 1 in order to prevent the heat of the heated hot water in the heating tank 150 from being transferred to the hot water pipe 1.

Figure 3:
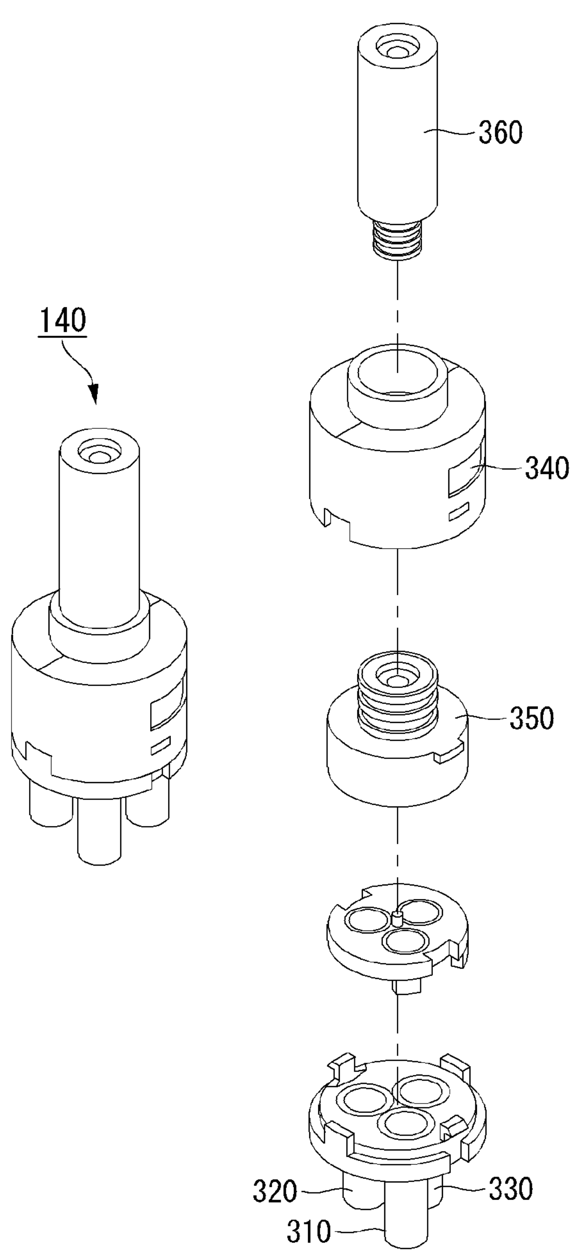
FIG. 3 is a diagram illustrating a detailed configuration of a cartridge applied to the electronic valve 140.

As illustrated in FIG. 2, the electronic valve 140 is constituted by a cartridge 142 and a driving motor 144. As illustrated in FIG. 3, the cartridge 142 is constituted by a first inflow pipe 310, a second inflow pipe 320, a third inflow pipe 330, a discharge pipe 340, a rotation plate 350, and a rotation knob 360. A rotational shaft of the driving motor 144 is connected to the rotation knob 360, and the driving motor 144 is driven, so the rotation knob 360 rotates as the rotational shaft rotates. In addition, the rotation plate 350 rotates in response to the rotation of the rotation knob 360. In this case, the driving motor 144 may be implemented by a servo motor of which rotational amount is determined according to an input pulse width, a step motor of which rotational amount is determined according to an input pulse number, etc.

When the servo motor is used as the driving motor 144, the rotational amount is determined according to the pulse width input from the controller 170. Hereinafter, a servo motor will be described as an example in which when the input pulse width is 0.5 ms, 1.5 ms, and 2.5 ms, rotational angles are 0°, 120°, and 240°, respectively. In this case, a relationship between the input pulse width and the rotational angle is shown in the following equation:

$$y = 120x - 60 \quad \text{[Equation 1]}$$

wherein, y represents the rotational angle (°) and x represents the input pulse width (ms).

An operation of the electronic valve 140 according to the rotation of the servo motor will be described by taking, as an example, a case where the water discharge pipe of the heating tank 150, the hot water direct supplying pipe 130, and the cold water pipe 2 are connected to the first inflow pipe 310, the second inflow pipe 320, and the third inflow pipe 330 of the cartridge 142 illustrated in FIG. 3, respectively.

Figure 4:
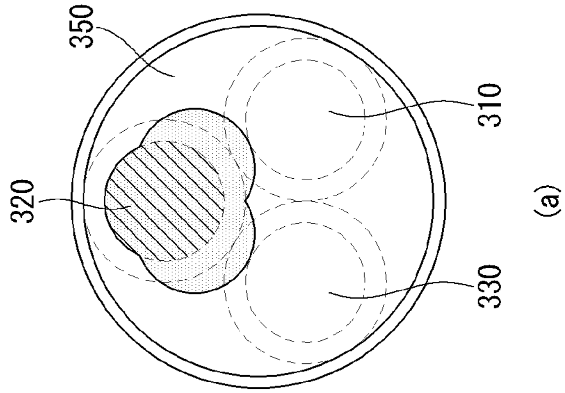
FIG. 4 is a diagram illustrating the operation state of a cartridge 142 according to a rotational angle of a serve motor.
Figure 4:
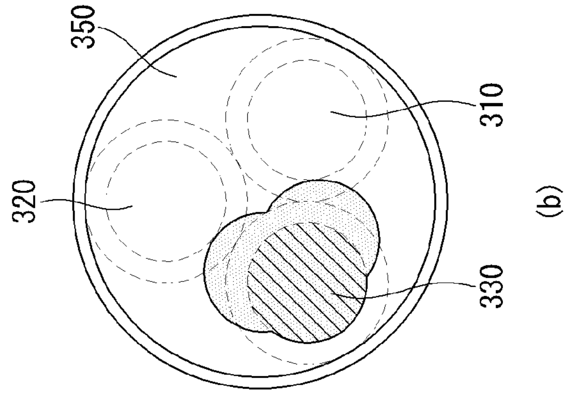

FIG. 4 is a diagram illustrating an operation state of a cartridge 142 according to a rotational angle of a serve motor.

Referring to FIG. 4, when a pulse having a width of 0.5 ms is input into the servo motor, the servo motor is driven while the rotational angle is 0°. Accordingly, the rotation knob 360 and the rotation plate 350 of the cartridge 142 become a state corresponding to 0° which is the rotational angle of the servo motor. In FIG. 4A, a corresponding state between the rotation plate 350 of the cartridge 142 corresponding to 0° which is the rotational angle of the servo motor, and the first inflow pipe 310, the second inflow pipe 320, and the third inflow pipe 330 is illustrated. When the rotational angle of the servo motor is 0° as illustrated in FIG. 4A, the cartridge 142 becomes a state in which only the heated hot water supplied from the heating tank 150 through the first inflow pipe 310 is discharged to the discharge pipe 340, and the second inflow pipe 320 and the third inflow pipe 330 are blocked, so the hot water supplied from the hot water direct supplying pipe 130 and the cold water supplied through the cold water pipe 2 are not discharged. Further, when a pulse having a width of 1.5 ms is input into the servo motor, the servo motor is driven in a state in which the rotational angle is 120°. Accordingly, the rotation knob 360 and the rotation plate 350 of the cartridge 142 become a state corresponding to 120° which is the rotational angle of the servo motor. In FIG. 4B, a corresponding state between the rotation plate 350 of the cartridge 142 corresponding to 120° which is the rotational angle of the servo motor, and the first inflow pipe 310, the second inflow pipe 320, and the third inflow pipe 330 is illustrated. When the rotational angle of the servo motor is 120° as illustrated in FIG. 4B, the cartridge 142 becomes a state in which only the hot water supplied from the hot water direct supplying pipe 130 through the second inflow pipe 320 is discharged to the discharge pipe 340, and the first inflow pipe 310 and the third inflow pipe 330 are blocked, so the heated hot water supplied from the heating tank 150 and the cold water supplied from the cold water pipe 2 are not discharged. Further, when a pulse having a width of 2.5 ms is input into the servo motor, the servo motor is driven in a state in which the rotational angle is 240°. Accordingly, the rotation knob 360 and the rotation plate 350 of the cartridge 142 become a state of corresponding to 240° which is the rotational angle of the servo motor. In FIG. 4C, a corresponding state between the rotation plate 350 of the cartridge 142 corresponding to 240° which is the rotational angle of the servo motor, and the first inflow pipe 310, the second inflow pipe 320, and the third inflow pipe 330 is illustrated. When the rotational angle of the servo motor is 240° as illustrated in FIG. 4C, the cartridge 142 becomes a state in which only the cold water supplied from the cold water pipe 2 through the third inflow pipe 330 is discharged to the discharge pipe 340, and the first inflow pipe 310 and the second inflow pipe 320 are blocked, so the heated hot water supplied from the heating tank 150 and the hot water supplied from the hot water direct supplying pipe 130 through the second inflow pipe 320 are not discharged.

Meanwhile, when a pulse having a width between 0.5 ms and 1.5 ms is input into the servo motor, the rotational angle of the servo motor is between 0° and 120°, and accordingly, the cartridge 142 becomes a state in which the heated hot water supplied from the heating tank 150 through the first inflow pipe 310 and the hot water supplied from the hot water direct supplying pipe 130 through the second inflow pipe 320 are mixed at a volume ratio according to the pulse width, and discharged to the discharge pipe 340. In this case, an angle and a mixing ratio at which the heated hot water and the hot water, and the hot water and the cold water are mixed vary depending on a location and a form of a through-hole formed in the rotation plate 350.

Figure 5:
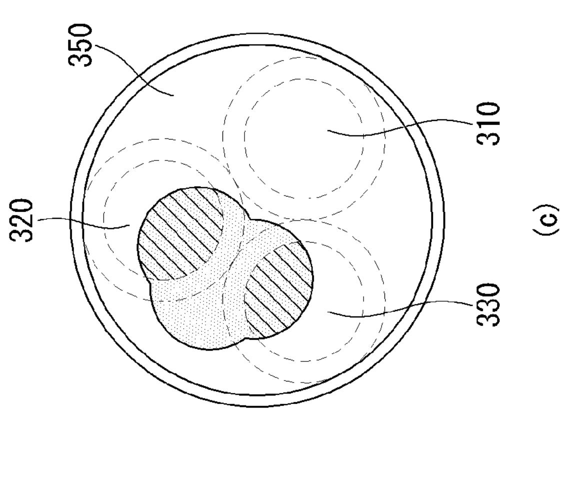
FIG. 5 is a diagram illustrating the operation state of the cartridge 142 when each of pulses having widths of 0.7 ms and 1.0 ms is input into the servo motor.
Figure 5:
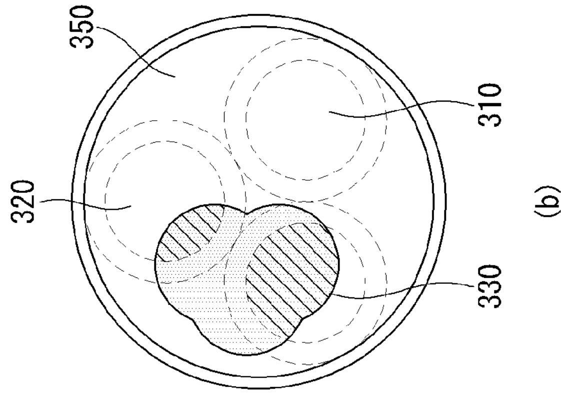
Figure 5:
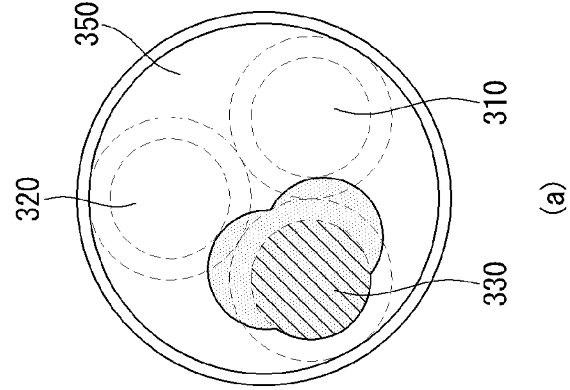

FIG. 5 illustrates the operation state of the cartridge 142 when each of pulses having widths of 0.5 ms, 0.7 ms, and 1.0 ms is input into the servo motor. Referring to FIG. 5A, when the pulse having the width of 0.5 ms is input into the servo motor, the rotational angle of the servo motor becomes 0°, and from this time, the cartridge 142 discharges only the heated hot water supplied from the heating tank 150 through the first inflow pipe 310 to the discharge pipe 340. Further, referring to FIG. 5B, when the pulse having the width of 0.7 ms is input into the servo motor, the rotational angle of the servo motor becomes 36°, and at this time, the cartridge 142 becomes a state in which the heated hot water supplied from the heating tank 150 through the first inflow pipe 310 and the hot water supplied from the hot water direct supplying pipe 130 through the second inflow pipe 320 are mixed at a volume ratio of approximately 5:1. Further, referring to FIG. 5C, when the pulse having the width of 1.0 ms is input into the servo motor, the rotational angle of the servo motor becomes 60°, and at this time, the cartridge 142 becomes a state in which the heated hot water supplied from the heating tank 150 through the first inflow pipe 310 and the hot water supplied from the hot water direct supplying pipe 130 through the second inflow pipe 320 are mixed at a volume ratio of approximately 1:1.

Figure 6:
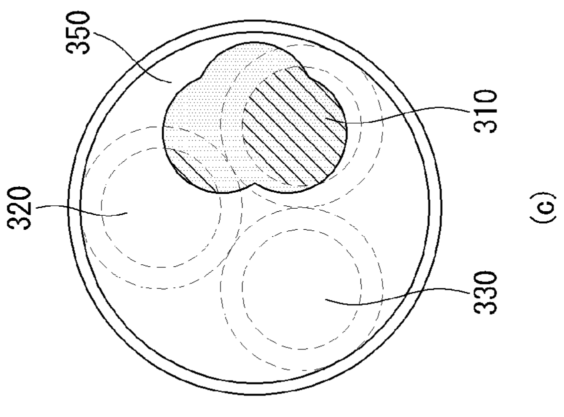
FIG. 6 is a diagram illustrating the operation state of the cartridge 142 when each of pulses having widths of 2.0 ms and 2.3 ms is input into a servo motor.
Figure 6:
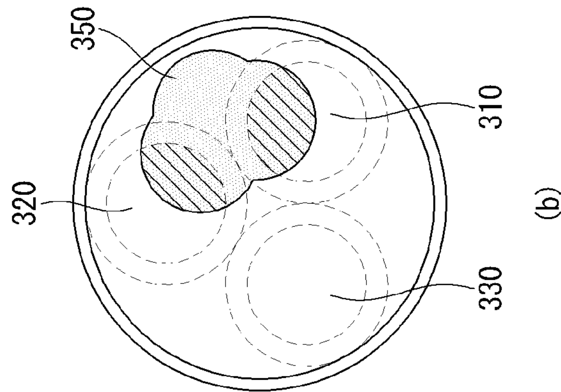
Figure 6:
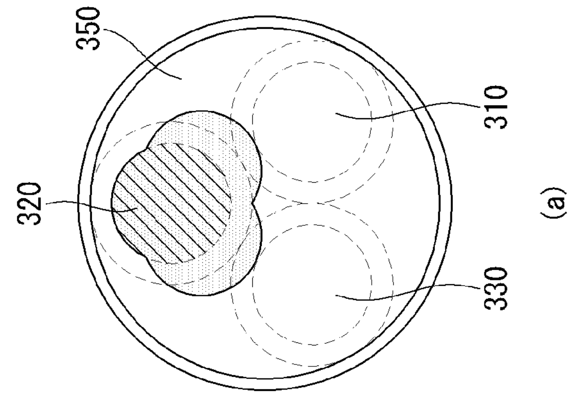

In addition, when a pulse having a width between 1.5 ms and 2.5 ms is input into the servo motor, the rotational angle of the servo motor is between 120° and 240°, and accordingly, the cartridge 142 becomes a state in which the hot water supplied from the hot water direct supplying pipe 130 through the second inflow pipe 320 and the cold water supplied from the cold water pipe 2 through the third inflow pipe 330 are mixed at the volume ratio according to the pulse width, and discharged to the discharge pipe 340. FIG. 6 illustrates the operation state of the cartridge 142 when each of pulses having widths of 1.5 ms, 2.0 ms, and 2.3 ms is input into the servo motor. Referring to FIG. 6A, when the pulse having the width of 1.5 ms is input into the servo motor, the rotational angle of the servo motor becomes 120°, and from this time, the cartridge 142 discharges only the hot water supplied from the hot water direct supplying pipe 130 through the second inflow pipe 320 to the discharge pipe 340. Further, referring to FIG. 6B, when the pulse having the width of 2.0 ms is input into the servo motor, the rotational angle of the servo motor becomes 180°, and at this time, the cartridge 142 becomes a state in which the hot water supplied from the hot water direct supplying pipe 130 through the second inflow pipe 320 and the cold water supplied from the cold water pipe 2 through the third inflow pipe 330 are mixed at a volume ratio of approximately 1:1. Further, referring to FIG. 6C, when the pulse having the width of 2.2 ms is input into the servo motor, the rotational angle of the servo motor becomes 204°, and at this time, the cartridge 142 becomes a state in which the hot water supplied from the hot water direct supplying pipe 130 through the second inflow pipe 320 and the cold water supplied from the cold water pipe 2 through the third inflow pipe 330 are mixed at a volume ratio of approximately 1:5.

Unlike this, when the step motor is used as the driving motor 144, a rotational angle and a rotational speed of the step motor are in proportion to the number of pulse signal and the frequency of pulse signal input from the controller 170, respectively, and accordingly, the rotational amount of the servo motor is determined. For example, assumed is a case where when 600 pulses are applied to the step motor in which a step value is 1.8, the step motor rotates at 360°, and accordingly, the rotation knob 360 rotates clockwise at 360°. An operation of the electronic valve 140 according to the rotation of the step motor will be described by taking, as an example, a case where the water discharge pipe of the heating tank 150, the hot water direct supplying pipe 130, and the cold water pipe 2 are connected to the first inflow pipe 310, the second inflow pipe 320, and the third inflow pipe 330 of the cartridge 142 illustrated in FIG. 3, respectively.

When the number of steps of the step motor is 0, an opening 352 formed in the rotation plate 350 of the cartridge 142 is positioned at a location at which only the first inflow pipe 310 into which heated hot water flows is opened, so a whole amount of only the heated hot water is discharged to the discharge pipe 340. Further, when the number of steps of the step motor is 200, the opening 352 formed in the rotation plate 350 of the cartridge 142 is positioned at a location at which only the second inflow pipe 320 into which remaining hot water flows is opened, so a whole amount of only remaining hot water is discharged to the discharge pipe 340. Further, when the number of steps of the step motor is 400, the opening 352 formed in the rotation plate 350 of the cartridge 142 is positioned at a location at which only the third inflow pipe 330 into which cold water flows is opened, so a whole amount of only cold water is discharged to the discharge pipe 340. Accordingly, when the number of steps of the step motor is changed between 0 and 200, the heated hot water and the remaining hot water are mixed at a volume ratio of 1:0 to 0:1, when the number of steps of the step motor is changed between 200 and 400, the remaining hot water and the cold water are mixed at a volume ratio of 1:0 to 0:1, and when the number of steps of the step motor is changed between 400 and 600, the cold water and the heated hot water are mixed at a volume ratio of 1:0 to 0:1. By such a method, two inflow pipes are selected among the first inflow pipe 310 into which the heated hot water is input, the second inflow pipe 320 into which the remaining hot water is input, and the third inflow pipe 330 into which the cold water is input, and then an opening ratio of two selected inflow pipes is adjusted by using the electronic valve 140 adopting the cartridge 142 illustrated in FIG. 3 to provide the discharge water at a temperature desired by the user through the faucet.

The flow rate sensor 160 is installed at a rear end of the discharge pipe 340 of the electronic valve 140 to measure the water amount of the discharge water discharged from the discharge pipe 240. The water amount of the discharge water measured by the flow rate sensor 160 is provided to the controller 170, through which the controller 170 may know whether the faucet has been used. That is, the controller 170 judges that the use of the faucet 3 is begun at a time when the water amount of the discharge water becomes larger than 0, and judges that the use of the faucet 3 is terminated at the time when the water amount of the discharge water becomes 0. Furthermore, the controller 170 may calculate the usage amount of the heated hot water, the hot water, and the cold water based on the water amount of the discharge water and the rotational angle of the electronic valve 140. When water having different water amounts and temperatures is supplied from two pipes, respectively, a water amount and a temperature of the mixed water may be calculated by an equation below:

$$t = \frac{T_H Q_H + T_L Q_L}{Q_H + Q_L} \qquad \text{[Equation 2]}$$

wherein, T represents the temperature of the discharge water, $T_H$ represents a temperature of water supplied from a first pipe, $T_L$ represents a temperature of water supplied from a second pipe, $Q_H$ represents a supply water amount of the water supplied from the first pipe, and $Q_L$ represents a water amount of the water supplied from the second pipe.

When the electronic valve 140 is in a state in which the heated hot water and the hot water supplied from the heating tank 120 and the hot water direct supplying pipe 130 are mixed at a volume ratio of 1:1 (that is, a state in which the pulse having the width of 1.0 ms is input into the servo motor and the rotational angle of the servo motor becomes 60° as illustrated in FIG. 5B), if the temperature of the hot water measured by the first temperature sensor 120*a* is 20° C., the temperature of the heated hot water measured by the third temperature sensor 120*c* is 60° C., the temperature of the discharge water measured by the fourth temperature sensor 120*d* is 38° C., and the water amount of the discharge water measured by the flow rate sensor 160 is 100 mℓ, the heated hot water and the hot water supplied to the electronic valve 140 become 45 mℓ and 55 mℓ, respectively, according to Equation 2. From this, it can be seen that the supply water amount of the hot water is larger than the supply water amount of the heated hot water. Of course, since the electronic valve 140 is in the state in which the heated hot water and the hot water are mixed at the volume ratio of 1:1, when the supply amounts of the heated hot water and the hot water are the same, the water amounts of the heated hot water and the hot water supplied to the electronic valve 140 are the same as 50 mℓ.

The device 100 for controlling a faucet according to the present invention may additionally include a display device (e.g., an LCD panel, electronic paper, a touch panel, etc.). A predetermined desired temperature and a desired temperature which is increased or decreased according to button pushing by the user may be output to the display device. Meanwhile, when a menu button for identifying the state of the device is additionally provided in addition to the buttons for increasing and decreasing the temperature, the amount of used water, a user-specific preferred temperature, etc., are displayed in the display device according to operating of the menu button by the user. Further, an error code corresponding to a malfunction or failure of the device 100 for controlling a faucet may be displayed in the display device.

Meanwhile, in the case where the display device is mounted on the device 100 for controlling a faucet according to the present invention, a power supply of the display device needs to be blocked when the faucet 3 is not used. To this end, a motion sensor (not illustrated) needs to be additionally mounted on the device 100 for controlling a faucet according to the present invention. The motion sensor is preferably installed near the display device. When a person is sensed by the motion sensor, the controller 170 turns on the display device, and when the person is not sensed by the motion sensor, the controller 170 turns off the display device. Unlike this, when the person is not sensed by the motion sensor for a predetermined time (e.g., 5 seconds), the controller 170 may also turn off the display device. Furthermore, the controller 170 may also control not to turn off the display device even though the persons is not sensed by the motion sensor when the water amount of the discharge water measured by the flow rate sensor 160 is not 0.

The controller 170 identifies the temperature of the hot water supplied through the hot water pipe 1, the temperature of the heated hot water in the heating tank 150, the temperature of the cold water supplied through the cold water pipe 2, and the temperature of the discharge water discharged from the electronic valve 140 based on signals input from the temperature sensors 120*a* to 120*d*. Further, the controller 170 controls the electronic valve 140 so that the temperature of the discharge water becomes the desired temperature of the user based on the identified temperatures of the hot water, the heated hot water, the cold water, the discharge water, and the desired temperature of the user.

First, the controller 170 compares the desired temperature of the user and the hot water temperature to select two connection pipes among three connection pipes 310 and 320, and 330 connected to the cartridge 142 of the electronic valve 140. In this case, when the desired temperature of the user is higher than or equal to the temperature of the hot water, the first connection pipe 310 through which the heated hot water is supplied and the second connection pipe 320 through which the hot water is supplied are selected, and when the desired temperature of the user is lower than the temperature of the hot water, the second connection pipe 320 through which the hot water is supplied and the third connection pipe 330 through which the cold water is supplied are selected. In addition, the controller 170 determines a mixing ratio of water at different temperatures supplied trough two selected connection pipes by using Equation 2, and controls the electronic valve 140 based thereon. In this case, an initial location of the electronic valve 140 may be controlled based on operation data of a place at which the device 100 for controlling a faucet according to the present invention is installed. Next, the controller 170 minutely controls the electronic valve 140 by comparing the temperature of the discharge water and the desired temperature of the user. Hereinafter, a case of applying the servo motor to the electronic valve 140 will be described as an example.

Figure 7:
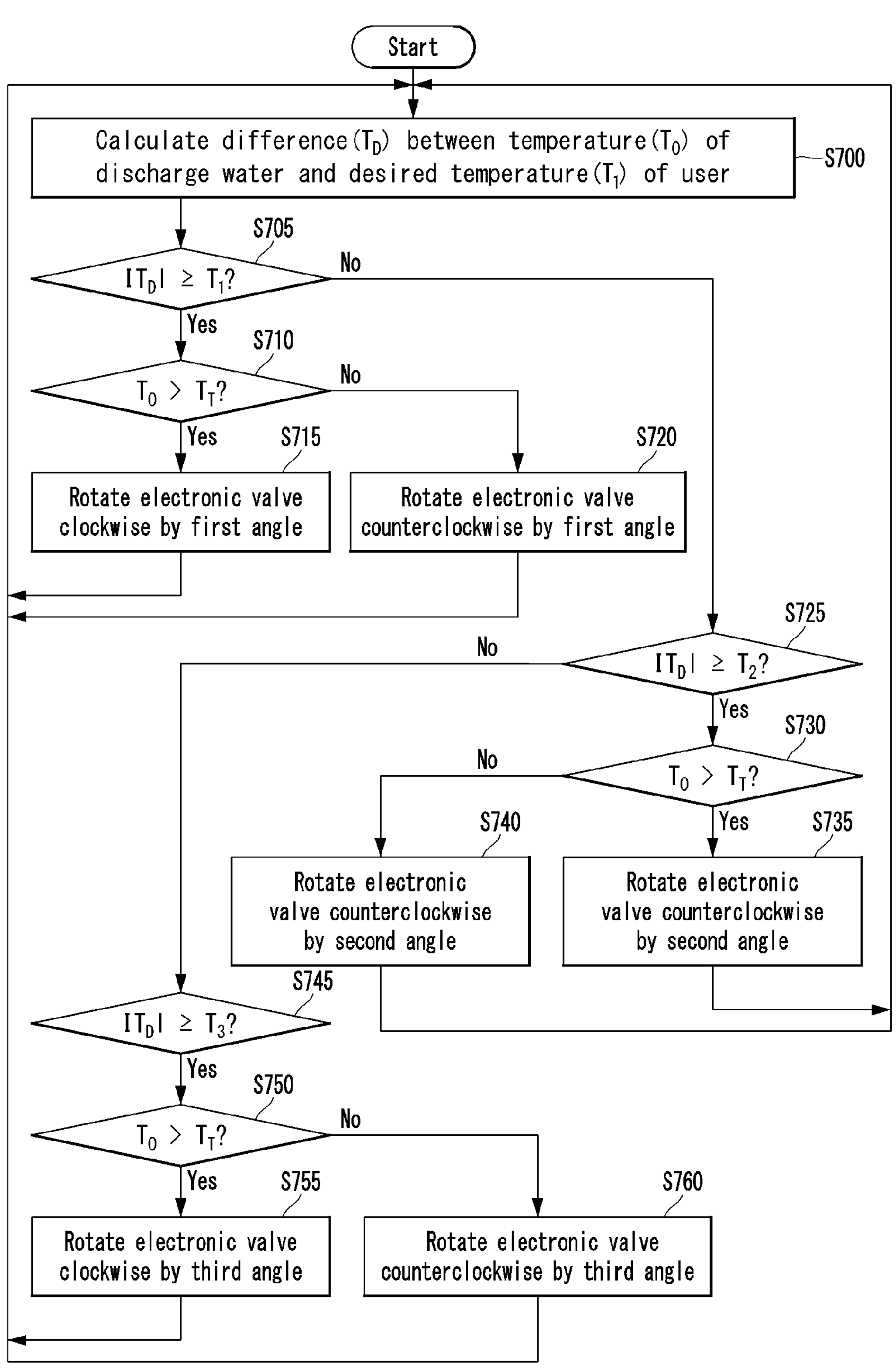
FIG. 7 is a flow chart illustrating a control method of the electronic valve 140.

FIG. 7 is a flow chart illustrating a control method of the electronic valve 140.

Referring to FIG. 7, the controller 170 calculates a difference $T_D$ between a temperature $T_O$ of discharge water and a desired temperature $T_T$ of a user (S700). In addition, when an absolute value of the difference between the temperature of the discharge water and the desired temperature of the user is higher than or equal to a first reference temperature $T_1$ (e.g., 5° C.) (S705), the controller 170 checks whether the temperature of the discharge water is higher than the desired temperature of the user (S710). When the temperature of the discharge water is higher than the desired temperature of the user, the controller 170 rotates the electronic valve 140 clockwise by a first angle (e.g., 10°) to increase the amount of water having a low temperature (S715). Unlike this, when the temperature of the discharge water is lower than the desired temperature of the user, the controller 170 rotates the electronic valve 140 counterclockwise by the first angle to increase the amount of water having a high temperature (S720).

Unlike this, when the absolute value of the difference between the temperature of the discharge water and the desired temperature of the user is lower than the first reference temperature and higher than or equal to a second reference temperature $T_2$ (e.g., 2° C.) (S725), the controller 170 checks whether the temperature of the discharge water is higher than the desired temperature of the user (S730). When the temperature of the discharge water is higher than the desired temperature of the user, the controller 170 rotates the electronic valve 140 clockwise by a second angle (e.g., 5°) to increase the amount of water having a low temperature (S735). Unlike this, when the temperature of the discharge water is lower than the desired temperature of the user, the controller 170 rotates the electronic valve 140 counterclockwise by the second angle to increase the amount of water having a high temperature (S740).

In addition, when the absolute value of the difference between the temperature of the discharge water and the desired temperature of the user is lower than the second reference temperature and higher than or equal to a third reference temperature $T_3$ (e.g., 1° C.) (S745), the controller 170 checks whether the temperature of the discharge water is higher than the desired temperature of the user (S750). When the temperature of the discharge water is higher than the desired temperature of the user, the controller 170 rotates the electronic valve 140 by a third angle (e.g., 1°) to increase the amount of water having a low temperature (S755). Unlike this, when the temperature of the discharge water is lower than the desired temperature of the user, the controller 170 rotates the electronic valve 140 by a third angle to increase the amount of water having a high temperature (S760). Such an operation is repeated until the absolute value of the difference between the temperature of the discharge water and the desired temperature of the user is lower than the third reference temperature. In addition, the controller 170 determines whether to control the electronic valve 140 by calculating a difference value between the temperature of the discharge water and the desired temperature of the user at a predetermined cycle until the use of the faucet is terminated.

Hereinafter, a control operation of the electronic valve 140 by the controller 170 will be described by taking, as an example, a case where an allowed rotational angle of the servo motor applied to the electronic valve is 0° to 240°, and when input pulse widths are 0.5 ms, 1.5 ms, and 2.5 ms, the rotational angles of the servo motor are 0°, 120°, and 240°, respectively.

For example, when the supply temperature of the hot water, the temperature of the heated hot water, and the desired temperature of the user are 20° C., 60° C., and 40° C., respectively, the temperature of the hot water is lower than the desired temperature of the user, so the controller 170 controls the electronic valve 140 to mix the heated hot water and the hot water supplied from the first connection pipe 310 and the second connection pipe 320, and mix the heated hot water and the hot water at the volume ratio of 1:1 according to a result calculated by Equation 2. In this case, when the rotational angle of the electronic valve 140 is 60°, the heated hot water and the hot water are mixed at the volume ratio of 1:1. Accordingly, the controller 170 outputs the pulse having the width of 1.0 ms to the electronic valve 140. Next, the controller 170 determines whether to minutely control the electronic valve 140 based on the temperature of the discharge water measured by the fourth temperature sensor 110*d*. When the temperature of the discharge water is 38° C., the temperature of the discharge water is lower than the desired temperature of the user by 2° C., so the controller 170 additionally rotates the electronic valve 140 clockwise by the second angle (e.g., 5°) to control the rotational angle to become 65°. Accordingly, the controller 170 provides the pulse having the width of 1.042 ms to the electronic valve 140 to increase the amount of the heated hot water and decrease the amount of the hot water. Next, the controller 170 determines whether to additionally control the electronic valve 140 based on the temperature of the discharge water measured by the fourth temperature sensor 110*d*. When the temperature of the discharge water is 41° C., the temperature of the discharge water is higher than the desired temperature of the user by 1° C., so the controller 170 additionally rotates the electronic valve 140 counterclockwise by the third angle (e.g., 1°) to control the rotational angle to become 64°. Accordingly, the controller 170 provides the pulse having the width of 1.033 ms to the electronic valve 140 to decrease the amount of the heated hot water and increase the amount of the hot water. As such, the controller 170 continuously compares the temperature of the discharge water and the desired temperature of the user to repeatedly control the electronic valve 140 until the difference between the temperature of the discharger water and the desired temperature of the user is less than the third reference temperature (e.g., 1° C.). In this case, the first to third reference temperatures, and rotational angles (first to third angles) corresponding to the respective reference temperatures may be experimentally determined.

Meanwhile, when the step motor is applied to the electronic valve 140, the electronic valve 140 is controlled so that the difference between the temperature of the discharge water and the desired temperature of the user becomes less than the third reference temperature by changing a step value of the step motor similarly to the case of applying the servo motor.

As described above, when the electronic valve 140 is controlled based on the difference value between the temperature of the discharge water and the desired temperature of the user, the temperature of the discharge water may be made to be equal to the desired temperature of the user or to be at least less than a predetermined temperature difference (e.g., 1° C. which is the third reference temperature) only with four temperature sensors 120*a* to 120*d* without using a flow rate sensor for measuring the supply amount of the hot water and the supply amount of the cold water. Furthermore, when the water amount of the hot water or cold water supplied to the faucet 3 is reduced due to the use of the hot water or cold water by other consumers (other bathrooms, kitchens, etc.), or when the water amount of the hot water or cold water supplied to the faucet 3 increases due to the stop of the use of the hot water or cold water by other consumers, the temperature of the discharge water may be rapidly made to be equal to the desired temperature of the user or to be at least less than the predetermined temperature difference (e.g., 1° C. which is the third reference temperature) without a separate control routine. The water amounts of the hot water and the cold water increase in two cases. First, when the hot water and the cold water is being supplied with a maximum supply water amount to a specific consumer, under the circumstance that the supply amount of the hot water or cold water to the corresponding consumer is reduced due to the use of the hot water or cold water by other consumers, if the use of hot water or cold water is terminated by other consumers, the supply amount of the hot water or cold water to the corresponding consumer increases. Second, when the hot water or cold water is used by a specific consumer, due to the use of the hot water or cold water by other consumers, the water or cold water is supplied with a water amount which does not reach the maximum supply water amount. When the use of the hot water or cold water is terminated in other consumers in such a state, the supply amount of the hot water or cold water to the corresponding consumer increases.

Meanwhile, in the embodiment in which the water discharge pipe of the heating tank 150, the hot water direct supplying pipe 130, and the cold water pipe 2 are connected to the first inflow pipe 310, the second inflow pipe 320, and the third inflow pipe 330 of the cartridge 142, respectively, as illustrated in FIG. 3, after the temperature of the hot water supplied through the hot water pipe 1 has reached the desired temperature (e.g., 40° C.) of the user, the electronic valve 140 mixes the hot water supplied from the hot water direct supplying pipe 130 through the second inflow pipe 320 and the cold water supplied from the cold water pipe 2 through the third inflow pipe 330, and discharges the discharge water of a desired temperature by the user. In this case, remaining hot water at the temperature lower than the desired temperature of the user occupies most of water in the heating tank 150. That is, when the temperature of the remaining hot water is 20° C., and the temperature of the heated hot water in the heating tank 150 is 65° C. at the use time of the faucet 3, the temperature of the water in the heating tank 150 generally has a value between 20° C. and 30° C. at the time when the temperature of the hot water supplied through the hot water pipe 1 has reached a lowest target temperature of the discharge water. This means that when a target heating temperature of the water existing in the heating tank 150 is set to 65° C. after the use of the faucet 3 is terminated afterward, a temperature which the heater 155 provided in the heating tank 150 should raise becomes 35° C. to 45° C. Accordingly, electricity consumption by the heater 155 increases compared to a case where the heating tank 150 is full of hot water of a maximum supply temperature (e.g., 50° C.) at the time when the use of the faucet 3 has been terminated.

Hereinafter, an operation of the electronic valve 140 according to the rotation of the servo motor will be described with reference to FIGS. 4 to 6 by taking, as an example, a case where the hot water direct supplying pipe 130, the water discharge pipe of the heating tank 150, and the cold water pipe 2 are connected to the first inflow pipe 310, the second inflow pipe 320, and the third inflow pipe 330 of the cartridge 142 illustrated in FIG. 3, respectively.

When the rotational angle of the servo motor is 0° as illustrated in FIG. 4A, the cartridge 142 becomes a state in which only the hot water supplied from the hot water direct supplying pipe 130 through the first inflow pipe 310 is discharged to the discharge pipe 340, and the second inflow pipe 320 and the third inflow pipe 330 are blocked, so the heated hot water supplied from the heating tank 150 and the cold water supplied through the cold water pipe 2 are not discharged. Further, when a pulse having a width of 1.5 ms is input into the servo motor, the servo motor is driven while the rotational angle is 120°. Accordingly, the rotation knob 360 and the rotation plate 350 of the cartridge 142 become a state corresponding to 120° which is the rotational angle of the servo motor. In FIG. 4B, a corresponding state between the rotation plate 350 of the cartridge 142 corresponding to 120° which is the rotational angle of the servo motor, and the first inflow pipe 310, the second inflow pipe 320, and the third inflow pipe 330 is illustrated. When the rotational angle of the servo motor is 120° as illustrated in FIG. 4B, only the heated hot water supplied from the heating tank 150 through the second inflow pipe 320 is discharged to the discharge pipe 340 in the cartridge 142, and the first inflow pipe 310 and the third inflow pipe 330 are blocked, so the hot water supplied from the hot water direct supplying pipe 130 and the cold water supplied from the cold water pipe 2 are not discharged. Further, when a pulse having a width of 2.5 ms is input into the servo motor, the servo motor is driven while the rotational angle is 240°. Accordingly, the rotation knob 360 and the rotation plate 350 of the cartridge 142 become a state corresponding to 2400 which is the rotational angle of the servo motor. In FIG. 4C, a corresponding state between the rotation plate 350 of the cartridge 142 corresponding to 2400 which is the rotational angle of the servo motor, and the first inflow pipe 310, the second inflow pipe 320, and the third inflow pipe 330 is illustrated. When the rotational angle of the servo motor is 240° as illustrated in FIG. 4C, only the cold water supplied from the cold water pipe 2 through the third inflow pipe 330 is discharged to the discharge pipe 340 in the cartridge 142, and the first inflow pipe 310 and the second inflow pipe 320 are blocked, so the hot water supplied from the hot water direct supplying pipe 130 through the first inflow pipe 310 and the heated hot water supplied from the heating tank 150 through the second inflow pipe 320 are not discharged.

Meanwhile, when a pulse having a width between 0.5 ms and 1.5 ms is input into the servo motor, the rotational angle of the servo motor is between 0° and 120°, and accordingly, the cartridge 142 becomes a state in which the heated hot water supplied from the heating tank 150 through the first inflow pipe 310 and the hot water supplied from the hot water direct supplying pipe 130 through the second inflow pipe 320 are mixed at a volume ratio according to the pulse width, and discharged to the discharge pipe 340. In this case, an angle and a mixing ratio at which the heated hot water and the hot water, and the hot water and the cold water are mixed vary depending on a location and a form of a through-hole formed in the rotation plate 350.

In FIG. 5, the operation state of the cartridge 142 when each of pulses having widths of 0.5 ms, 0.7 ms, and 1.0 ms is input into the servo motor is illustrated. Referring to FIG. 5A, when the pulse having the width of 0.5 ms is input into the servo motor, the rotational angle of the servo motor becomes 0°, and from this time, the cartridge 142 discharges only the hot water supplied from the hot water direct supplying pipe 130 through the first inflow pipe 310 to the discharge pipe 340. Further, referring to FIG. 5B, when the pulse having the width of 0.7 ms is input into the servo motor, the rotational angle of the servo motor becomes 36°, and at this time, the cartridge 142 becomes a state in which the hot water supplied from the hot water direct supplying pipe 130 through the first inflow pipe 310 and the heated hot water supplied from the heating tank 150 through the second inflow pipe 320 are mixed at a volume ratio of approximately 5:1. Further, referring to FIG. 5C, when the pulse having the width of 1.0 ms is input into the servo motor, the rotational angle of the servo motor becomes 60°, and at this time, the cartridge 142 becomes a state in which the hot water supplied from the hot water direct supplying pipe 130 through the first inflow pipe 310 and the heated hot water supplied from the heating tank 150 through the second inflow pipe 320 are mixed at a volume ratio of approximately 1:1.

Further, when a pulse having a width between 1.5 ms and 2.5 ms is input into the servo motor, the rotational angle of the servo motor is between 120° and 240°, and accordingly, the cartridge 142 becomes a state in which the heated hot water supplied from the heating tank 150 through the second inflow pipe 320 and the cold water supplied from the cold water pipe 2 through the third inflow pipe 330 are mixed at the volume ratio according to the pulse width, and discharged to the discharge pipe 340. In FIG. 6, the operation state of the cartridge 142 when each of pulses having widths of 1.5 ms, 2.0 ms, and 2.3 ms is input into the servo motor is illustrated. Referring to FIG. 6A, when the pulse having the width of 1.5 ms is input into the servo motor, the rotational angle of the servo motor becomes 120°, and from this time, the cartridge 142 discharges only the heated hot water supplied from the heating tank 150 through the second inflow pipe 320 to the discharge pipe 340. Further, referring to FIG. 6B, when the pulse having the width of 2.0 is input into the servo motor, the rotational angle of the servo motor becomes 180°, and at this time, the cartridge 142 becomes a state in which the heated hot water supplied from the heating tank 150 through the second inflow pipe 320 and the cold water supplied from the cold pipe 2 through the third inflow pipe 330 are mixed at a volume ratio of approximately 1:1. Further, referring to FIG. 6C, when the pulse having the width of 2.2 ms is input into the servo motor, the rotational angle of the servo motor becomes 204°, and at this time, the cartridge 142 becomes a state in which the heated hot water supplied from the heating tank 150 through the second inflow pipe 320 and the cold water supplied from the cold pipe 2 through the third inflow pipe 330 are mixed at a volume ratio of approximately 1:5.

Meanwhile, when the water discharge pipe of the heating tank 150, the hot water direct supplying pipe 130, and the cold water pipe 2 are connected to the first inflow pipe 310, the second inflow pipe 320, and the third inflow pipe 330 of the cartridge 142, respectively, as illustrated in FIG. 3, the electronic valve 140 is controlled within an angle range in a state in which the heated hot water supplied from the heating tank 150 to the first inflow pipe 310 and the hot water supplied to the second inflow pipe 320 through the hot water direct supplying pipe 130 are mixed up to the time when the temperature of the hot water supplied through the hot water direct supplying pipe 130 reaches the desired temperature (e.g., 40° C.) of the user from the use time of the faucet 3, and the electronic valve 140 is controlled within an angle range in a state in which the hot water supplied to the second inflow pipe 320 through the hot water direct supplying pipe 130 and the cold water supplied to the third inflow pipe 130 through the cold water pipe 2 are mixed from the time when the temperature of the hot water supplied through the hot water direct supplying pipe 310 reaches the desired temperature of the user. In other words, when the water discharge pipe of the heating tank 150, the hot water direct supplying pipe 130, and the cold water pipe 2 are connected to the first inflow pipe 310, the second inflow pipe 320, and the third inflow pipe 330 of the cartridge 142, respectively, as illustrated in FIG. 3, the electronic valve 140 operates within a first interval of being controlled within a range of 0° to 120° in a state in which the heated hot water supplied to the first inflow pipe 310 and the hot water supplied to the second inflow pipe 320 are mixed up to the time when the temperature of the hot water supplied through the hot water direct supplying pipe 130 reaches the desired temperature of the user from the use time of the faucet 3, and the electronic valve 140 operates within a second interval of being controlled in a range of 120° to 240° in which the hot water supplied to the second inflow pipe 320 and the cold water supplied to the third inflow pipe 130 are mixed after the temperature of the hot water supplied through the hot water direct supplying pipe 310 has reached the desired temperature of the user.

Unlike this, when the hot water direct supplying pipe 130, and the water discharge pipe and the cold water pipe 2 of the heating tank 150 are connected to the first inflow pipe 310, the second inflow pipe 320, and the third inflow pipe 330 of the cartridge 142, respectively, as illustrated in FIG. 3, the electronic valve 140 operates within the first interval of being controlled in the range of 0° C. to 120° C. in which the hot water supplied from the first inflow pipe 310 and the heated hot water supplied to the second inflow pipe 320 are mixed up to a time $t_1$ when the temperature of the hot water supplied through the hot water direct supplying pipe 130 reaches the desired temperature (e.g., 40° C.) of the user from the use time of the faucet 3. In addition, the temperature of the heated hot water supplied from the heating tank 150 to the second inflow pipe 320 of the electronic valve 140 should be maintained to be higher than or equal to the desired temperature of the user at the time $t_1$ when the temperature of the hot water supplied through the hot water direct supplying pipe 130 reaches the desired temperature of the user. In this case, when the hot water supplied to the first inflow pipe 210 and the heated hot water supplied to the second inflow pipe 210 are mixed in the case where the temperature of the hot water of the heated hot water supplied to the second inflow pipe 320 of the electronic valve 140 from the heating tank 150 is higher than the desired temperature of the user, there is a problem in that the temperature of the discharge water becomes higher than the desired temperature of the user. Accordingly, the electronic valve 140 operates within the second interval of being controlled in the range of 120° to 240° in which the heated hot water supplied to the second inflow pipe 320 and the cold water supplied to the third inflow pipe 330 are mixed from the time $t_1$ when the temperature of the hot water supplied through the hot water direct supplying pipe 130 reaches the desired temperature of the user to a time $t_2$ when the temperature of the heated hot water supplied from the heating tank 150 to the second inflow pipe 320 of the electronic valve 140 reaches the desired temperature of the user. Next, from the time $t_2$ when the heated hot water supplied from the heating tank 150 to the second inflow pipe 320 of the electronic valve 140 reaches the desired temperature of the user, the temperature of the heated hot water supplied from the heating tank 150 is drastically lowered to the temperature (e.g., 20° C.) of the hot water supplied from the hot water pipe 1 at the time of use of the faucet 3, and the corresponding temperature is maintained for a predetermined time, and then is gradually raised to the desired temperature of the user. In this case, when the heated hot water supplied to the second inflow pipe 320 and the cold water supplied to the third inflow pipe 330 are mixed after the time $t_2$ when the temperature of the heated hot water supplied from the heating tank 150 to the second inflow pipe 320 of the electronic valve 140 reaches the desired temperature of the user, there is a problem in that the temperature of the discharge water becomes lower than the desired temperature of the user. Accordingly, from the time $t_2$ when the heated hot water supplied from the heating tank 150 to the second inflow pipe 320 of the electronic valve 140 has reached the desired temperature of the user up to a time $t_3$ when the temperature of the heated hot water supplied from the heating tank 150 to the second inflow pipe 320 of the electronic valve 140 has reached the desired temperature of the user again, the electronic valve 140 operates within the first interval of being controlled in the range of 0° to 120° in which the hot water supplied to the first inflow pipe 310 and the heated hot water supplied to the second inflow pipe 320 are mixed. In addition, after the time $t_3$ when the temperature of the heated hot water supplied to the second inflow pipe 320 of the electronic valve 140 has reached the desired temperature of the user again, the electronic valve 140 operates within the second interval of being controlled in the range of 120° to 240° in which the heated hot water supplied to the second inflow pipe 320 and the cold water supplied to the third inflow pipe 330 are mixed. When the electronic valve 140 is controlled as such, the heating tank 150 is full of hot water of a maximum supply temperature (e.g., 50° C.) at the time when the use of the faucet 3 is terminated. Therefore, when a target heating temperature of the water existing in the heating tank 150 is set to 65° C. after the use of the faucet 3 is terminated, a temperature which the heater 155 provided in the heating tank 150 should raise becomes 15° C., so the electricity consumption by the heater 155 may be reduced.

Meanwhile, in the embodiment described with reference to FIGS. 1 to 7, the discharge of the discharge water to the faucet may be electronically controlled. For example, the discharge amount of the discharge water may be controlled by the separate electronic valve installed between the electronic valve 140 and the faucet 3 as illustrated in FIG. 1 to provide the discharge water of a target water amount to the faucet 3.

Figure 8:
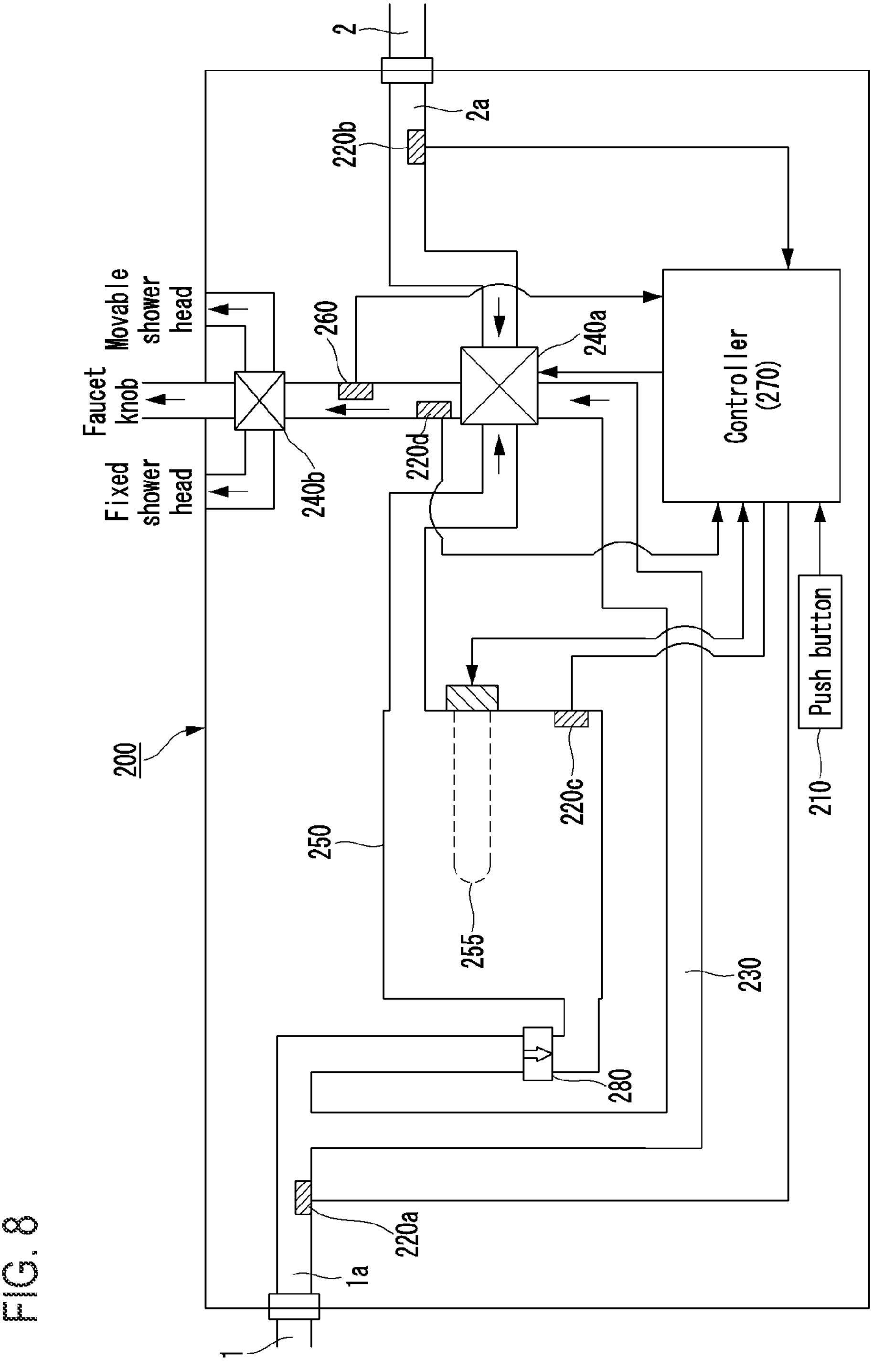
FIG. 8 is a diagram illustrating an embodiment of providing discharge water of a target water amount to a faucet by adjusting a discharge amount of the discharge water by a separate electronic valve installed between the electronic valve 140 and the faucet illustrated in FIG. 1, FIGS. 9 and 10 are diagrams illustrating embodiments of a cartridge which can switch a discharge direction of the discharge water discharged from the device for controlling a faucet according to an embodiment of the present invention.

FIG. 8 is a diagram of the embodiment illustrating that the discharge water of a target water amount is adjusted by a separate electronic valve installed between the electronic valve 140 and a faucet to provide to the faucet as illustrated in FIG. 1.

Referring to FIG. 8, as compared with the embodiment illustrated in FIG. 1, a second electronic valve 240*b* is added between a first electronic valve 240*a* corresponding to the electronic valve 140 of FIG. 1, and the faucet 3. The first electronic valve 240*a* operates in the same manner as the electronic valve 140 illustrated in FIG. 1, and the second electronic valve 240*b* receives the discharge water from an output pipe of the first electronic valve 240*a*, and outputs the discharge water, and controls a discharge amount of mixed hot water input from the output pipe of the first electronic valve 240*a*, and outputs the mixed hot water to a faucet knob or a shower head. In the embodiment 800 illustrated in FIG. 8, a temperature and water amount setting means 3*a* may be implemented in various forms as described above.

Figure 9:
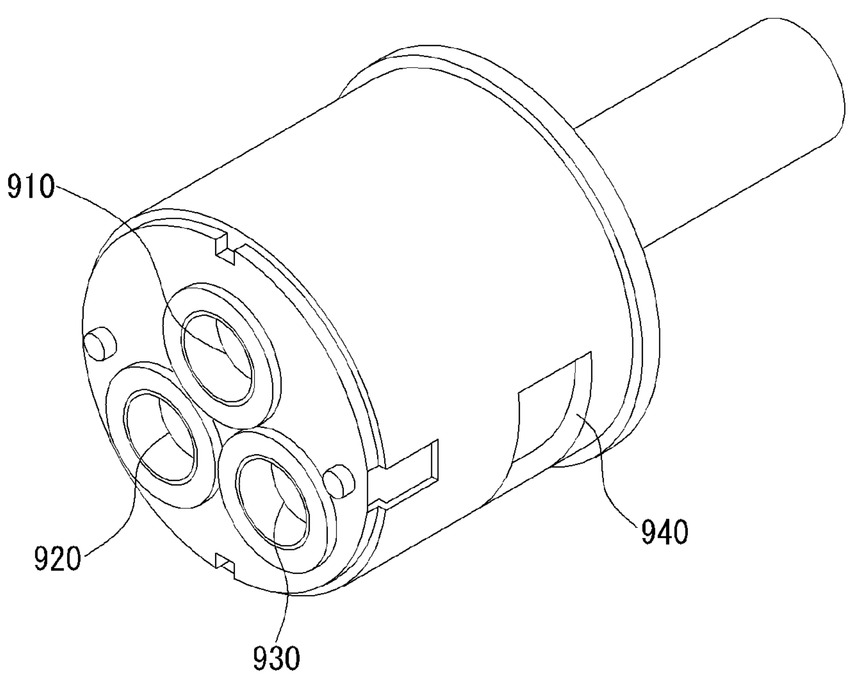
Figure 10:
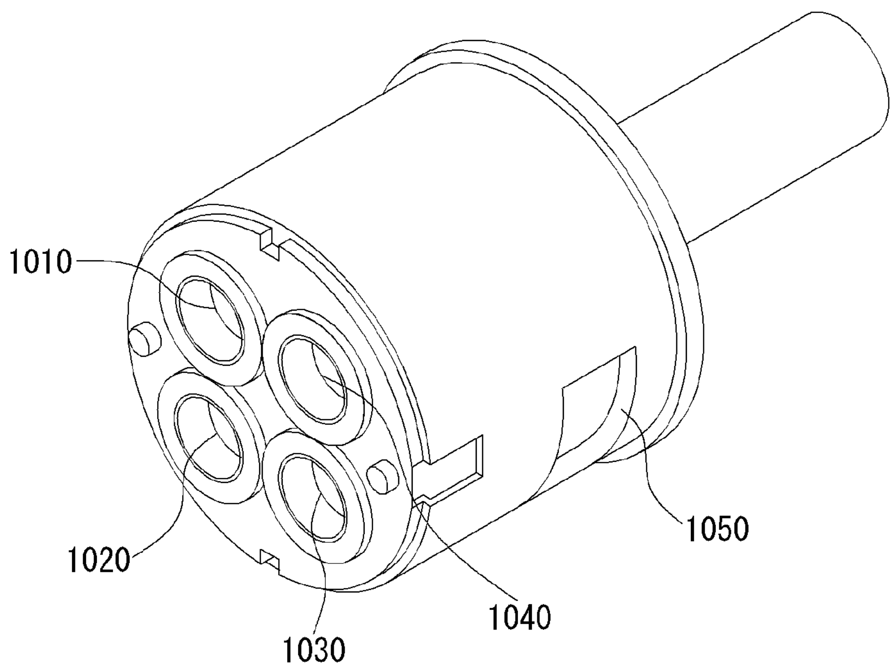

In this case, an electronic valve adopting a cartridge controlling a water discharge amount of input water may be used as the second electronic valve 240*b*. In this case, the controller 270 controls an opening/closing level of the cartridge by controlling a motor (servo motor, step motor, etc.) provided in the second electronic value 240*b* in response to a target water amount of the discharge water, thereby allowing the water amount of the discharge water to be discharged to the faucet knob or the shower head with the target water amount. The cartridge illustrated in FIG. 9 or 10 may be adopted for the second electronic valve 240*b* installed between the first electronic valve 240*a* and the faucet 3 as illustrated in FIG. 8. When the electronic valve illustrated in FIG. 9 is adopted, a water discharge pipe of the first electronic valve 240*a* illustrated in FIG. 8 may be connected to a discharge pipe 940, the faucet knob may be connected to a first inflow pipe 910, and a movable shower head may be connected to a second inflow pipe 920. In this case, a third inflow pipe 930 is blocked. Accordingly, when the second electronic valve 240*b* adopting the cartridge illustrated in FIG. 9 is used, the discharge water is discharged to any one of the faucet 3 and the movable shower head or the discharge water is not discharged to either side according to a rotational state of a motor provided in the second electronic valve 240*b* by the controller 270. In this case, a flow rate of the discharge water discharged to the first inflow pipe 910 or the second inflow pipe 920 varies depending on a rotational amount of the electronic valve 240*b*. Unlike this, when the electronic valve illustrated in FIG. 10 is adopted, a water discharge pipe of the first electronic valve 240*a* illustrated in FIG. 8 may be connected to a discharge pipe 1050, the faucet knob may be connected to a first inflow pipe 1010, the movable shower head may be connected to a second inflow pipe 1020, and a fixed shower head may be connected to a third inflow pipe 1030. In this case, a fourth inflow pipe 1040 is blocked. Accordingly, when the second electronic valve 240*b* adopting the cartridge illustrated in FIG. 10 is used, the discharge water is discharged to any one of the faucet knob, the movable shower head or the fixed shower head, or not discharged to either side according to the rotational state of the motor provided in the second electronic valve 240*b* by the controller 270. In this case, flow rates of the discharge water discharged to two inflow pipes adjacent to the fourth inflow pipe 1040 varies depending on the rotational amount of the electronic valve 240*b*. Accordingly, when flow rate control is to be applied to the faucet knob and the movable shower head among the faucet knob, the fixed shower head and the movable shower head, the faucet knob and the movable shower head should be connected to inflow pipes adjacent to the fourth inflow pipe 1040.

In the above description, when the electronic valves adopting the cartridges illustrated in FIGS. 9 and 10 are used as the second electronic valve 240*b* of the embodiment illustrated in FIG. 8, the discharge pipe of each cartridge serves as an inlet pipe of the second electronic valve 240*b*, and an inflow pipe of each cartridge serves as the discharge pipe of the second electronic valve 240*b*. As described above, in the embodiment illustrated in FIG. 8, a water discharge direction of the discharge water, a water amount of the discharge water, etc., are all automatically controlled by the electronic valves 240*a* and 240*b*. Accordingly, when the controller 170 is equipped with a communication function such as WiFi, ZigBee, Bluetooth, X-Wave, etc. or is equipped with a home network function, the controller 170 may control the device for controlling a faucet 200 according to the present invention remotely by using a home network control device or a smartphone of the user. Accordingly, the user may control the device for controlling a faucet 200 remotely to fill a bathtub with water of a desired temperature at a desired time. In this case, a drain blocking device driven by the device for controlling a faucet 200 according to the present invention is installed in a drain hole of the bathtub, and when a bathtub water collection function is performed, the drain hole of the bathtub is blocked by the drain blocking device.

Meanwhile, the controller 170 determines whether to drive the heater 155 based on the temperature of the hot water temperature in the hot water pipe 1 measured by the first temperature sensor 120*a*, the temperature of the heated hot water in the heating tank 150 measured by the third temperature sensor 120*c*, a capacity of remaining hot water which remains in the hot water pipe 1 to the faucet from a supply point of the hot water, a capacity of the heater, etc. In this case, considering that a heating time of water by the heater 155 also increases as the capacity of the heating tank 150 is increased, it is preferable that the capacity of the heating tank 150 is appropriately determined between 1 ℓ and 3 ℓ. Further, a method may also be adopted, which a target temperature and a target water amount of the discharge water are set differently from a desired temperature and a desired water amount set by the user until the remaining hot water is exhausted which remains in a pipe between the supply point of the hot water and the heating tank 150 in order to minimize a driving time of the heater 155 without excessively increasing the capacity of the heating tank 150. For example, even though the desired temperature and the desired water amount set by the user are 45° C. and 80 mℓ/second, respectively, the target temperature and the target water amount of the discharge water may be limited to 40° C. and 60 mℓ/second until the remaining hot water is exhausted which remains in the pipe between the supply point of the hot water and the heating tank 150. These limit values are determined based on the capacity of the heating tank 150, the capacity of the heater 155, the water amount of the remaining hot water, etc.

The heating tank 150 is manufactured with a capacity to keep water of a predetermined amount (e.g., 2ℓ), and the heater 155 and the third temperature sensor 120*c* are installed in the heating tank 150. While the faucet does not operate (while the user does not use water), the heater 155 installed inside the heating tank 150 is driven to heat water inside the heating tank 150 at a predetermined first temperature (e.g., 65° C.). When the temperature of the water inside the heating tank 250 reaches the first temperature, the controller 170 stops an operation of the heater 155. In such a state, when the temperature of water inside the heating tank 150 decreases to a predetermined second temperature (e.g., 40° C.), the controller 170 repeats the operation of heating the water inside the heating tank 150 at the predetermined first temperature by driving the heater 155 again. In this case, it is preferable not to drive the heater 155 when the temperature of the hot water measured by the first temperature sensor 120*a* is higher than or equal to the first temperature, and to drive the heater 155 when the temperature of the hot water measured by the first temperature sensor 120*a* reaches the first temperature.

Meanwhile, when it is determined whether to drive the heater 155 only by the temperature measured by the third temperature sensor 120*c* as described above, it is possible to stably supply the hot water, but there is a problem in that power consumption increases. When the faucet 3 is not used, the controller 170 may optimize, by considering such a problem, the power consumption when determining whether to drive the heater 155 based on measurement values of the first temperature sensor 120*a* and the third temperature sensor 120*c*. FIG. 11 is a diagram illustrating an example of a driving method of a heater 155 by a controller 170 based on measurement values of a first temperature sensor 120*a* and a third temperature sensor 120*c* when a faucet 3 is not used.

Referring to FIG. 11, when power is supplied to the device 100 for controlling a faucet according to the present invention, the controller 170 periodically identifies a temperature of hot water in a hot water pipe 1 and a temperature of heated hot water in a heating tank 150 measured by the first temperature sensor 120*a* and the third temperature sensor 120*c* (S1100). First, the controller 170 checks whether a measurement value T1 of the first temperature sensor 120*a* is lower than a first reference temperature V1 (S1105). When the measurement value T1 of the first temperature sensor 120*a* is higher than or equal to the first reference temperature V1, the controller 170 turns off the heater 155 (S1125). Unlike this, when the measurement value T1 of the first temperature sensor 120*a* is lower than the first reference temperature V1, the controller 170 confirms whether the measurement value T1 of the first temperature sensor 120*a* is lower than a second reference temperature V2 (S1110). When the measurement value T1 of the first temperature sensor 120*a* is higher than or equal to the second reference temperature V2, the controller 170 confirms whether a measurement value T3 of the third temperature sensor 120*c* is lower than a seventh reference temperature V7 (S1130). When the measurement value T3 of the third temperature sensor 120*c* is higher than or equal to the seventh reference temperature V7 in step S1130, the controller 170 turns off the heater 155 (S1125). Unlike this, when the measurement value T3 of the third temperature sensor 120*c* is lower than the seventh reference temperature V7, the controller 170 turns on the heater (S1150). In addition, when the measurement value T3 of the third temperature sensor 120*c* is higher than or equal to an eighth reference temperature V8 while the heater 155 is turned on, the controller 170 turns off the heater 155 (S1125). Unlike this, when the measurement value T3 of the third temperature sensor 120*c* is lower than the eighth reference temperature V8, the controller 170 maintains the heater 155 in a turn-on state (S1150), and when the measurement value T3 of the third temperature sensor 120*c* is higher than or equal to the eighth reference temperature V8, the controller 170 turns off the heater 155 (S1125).

When it is confirmed that the measurement value T1 of the first temperature sensor 120*a* is lower than the second reference temperature V2 in step S1110, the controller 170 confirms whether the measurement value T1 of the first temperature sensor 120*a* is lower than a third reference temperature V3 (S1115). When the measurement value T1 of the first temperature sensor 120*a* is higher than or equal to the third reference temperature V3, the controller 170 confirms whether a measurement value T3 of the third temperature sensor 120*c* is lower than the eighth reference temperature V8 (S1135). When the measurement value T3 of the third temperature sensor 120*c* is higher than or equal to the eighth reference temperature V8 in step S1135, the controller 170 turns off the heater 155 (S1125). Unlike this, when the measurement value T3 of the third temperature sensor 120*c* is lower than the eighth reference temperature V8, the controller 170 turns on the heater (S1160). In addition, when the measurement value T3 of the third temperature sensor 120*c* is higher than or equal to a ninth reference temperature V9 while the heater 155 is turned on, the controller 170 turns off the heater 155 (S1125). Unlike this, when the measurement value T3 of the third temperature sensor 120*c* is lower than the ninth reference temperature V9, the controller 170 maintains the heater 155 in the turn-on state (S1160), and when the measurement value T3 of the third temperature sensor 120*c* reaches the ninth reference temperature V9, the controller 170 turns off the heater 155 (S1125).

When it is confirmed that the measurement value T1 of the first temperature sensor 120*a* is lower than the third reference temperature V3 in step S1115, the controller 170 confirms whether the measurement value T1 of the first temperature sensor 120*a* is lower than a fourth reference temperature V4 (S1120). When the measurement value T1 of the first temperature sensor 120*a* is higher than or equal to the fourth reference temperature V4, the controller 170 confirms whether the measurement value T3 of the third temperature sensor 120*c* is lower than the ninth reference temperature V9 (S1140). When the measurement value T3 of the third temperature sensor 120*c* is higher than or equal to the ninth reference temperature V9 in step S1140, the controller 170 turns off the heater 155 (S1125). Unlike this, when the measurement value T3 of the third temperature sensor 120*c* is lower than the ninth reference temperature V9, the controller 170 turns on the heater 155 (S1170). In addition, when the measurement value T3 of the third temperature sensor 120*c* is higher than or equal to a tenth reference temperature V10 while the heater 155 is turned on, the controller 170 turns off the heater 155 (S1125). Unlike this, when the measurement value T3 of the third temperature sensor 120*c* is lower than the tenth reference temperature V10, the controller 170 maintains the heater 155 in the turn-on state (S1170), and when the measurement value T3 of the third temperature sensor 120*c* reaches the tenth reference temperature V10, the controller 170 turns off the heater 155 (S1125).

When it is confirmed that the measurement value T1 of the first temperature sensor 120*a* is lower than the fourth reference temperature V4 in step S1120, the controller 170 confirms whether the measurement value T3 of the third temperature sensor 120*c* is lower than the tenth reference temperature V10 (S1145). When the measurement value T3 of the third temperature sensor 120*c* is higher than or equal to the tenth reference temperature V10 in step S1045, the controller 170 turns off the heater 155 (S1125). Unlike this, when the measurement value T3 of the third temperature sensor 120*c* is lower than the tenth reference temperature V10, the controller 170 turns off the heater 155 (S1180). In addition, when the measurement value T3 of the third temperature sensor 120*c* is higher than or equal to the tenth reference temperature V10 while the heater 155 is turned on, the controller 170 turns off the heater 155 (S1125). Unlike this, when the measurement value T3 of the third temperature sensor 120*c* is lower than the tenth reference temperature V10, the controller 170 maintains the heater 155 in the turn-on state (S1180), and when the measurement value T3 of the third temperature sensor 120*c* reaches the tenth reference temperature V10, the controller 170 turns off the heater 155 (S1125).

In the above description, respective reference temperatures may be set as described in the following table. The reference temperatures may be changed by the capacity of the heating tank 150, the capacity of the remaining hot water in the hot water pipe 1, the capacity of the heater 155, a maximum heating temperature of the hot water set for the heating tank 150, the temperature of the remaining hot water in the hot water pipe 1, the temperature of the cold water in the cold water pipe 2, etc.

TABLE 2

| Classification | Reference temperature |
|---|---|
| V1 | 35 |
| V2 | 30 |
| V3 | 25 |
| V4 | 20 |
| V5 | 40 |
| V6 | 45 |
| V7 | 50 |
| V8 | 55 |
| V9 | 60 |
| V10 | 65 |

As described above, when on/off of the heater 155 is actively controlled according to cooling levels of the remaining hot water in the hot water pipe 1 and the heated hot water in the heating tank 150, discharge water of a temperature desired by the user may be provided immediately when a subsequent user uses the faucet 3, and at the same time, electric power consumed for driving the heater 155 may be reduced.

As described with reference to FIG. 11, when the device 100 for controlling a faucet according to the present invention is not used, on/off of the heater 155 may be controlled based on reference temperatures set in advance for values of the first temperature sensor 120*a* and the third temperature sensor 120*c*. Unlike this, whether to operate the heater 155 may be controlled based on a lowest supply temperature of the remaining hot water supplied through the hot water direct supplying pipe 130, a highest temperature of the heated hot water in the heating tank 150, etc.

Figure 12:
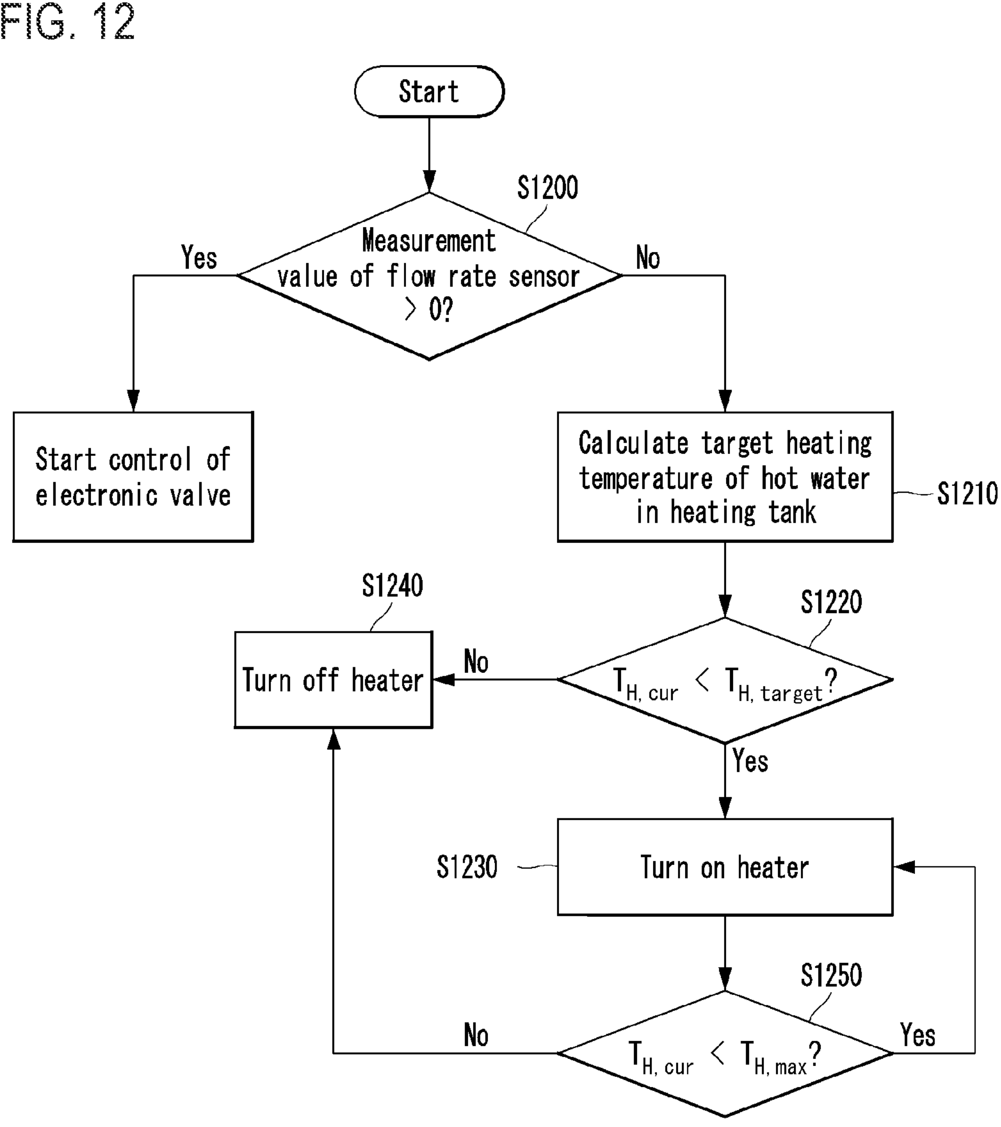
FIG. 12 is a diagram illustrating a specific example of the driving method of the heater 155 performed by the controller 170**.

FIG. 12 is a diagram illustrating a driving method of the heater 155 performed by the controller 170.

Referring to FIG. 12, the controller 170 identifies whether to use the faucet 3 based on a flow rate value input from the flow rate sensor 160 (S1200). In this case, the controller 170 determines that the faucet 3 is being used when a measurement value input from the flow rate sensor 160 is larger than 0. Next, when determining that the faucet 3 is not being used, the controller 170 calculates a target heating temperature of the hot water in the heating tank 150 by the following equation (S1210):

$$T_H(t)\frac{T_T Q - T_W(t)(Q - Q_H(t))}{Q_H(t)} \quad \text{[Equation 3]}$$

wherein, $T_T$ represents a target temperature of the discharge water, $T_H(t)$ represents a temperature of the heated hot water depending on the time elapsed from a use start time of the faucet 3, $T_W(t)$ represents a temperature of the remaining hot water depending on the time elapsed from the use start time of the faucet 3, Q represents a total amount ($\ell$) of the remaining hot water which remains in the hot water pipe between the supply point of the hot water and the faucet 3, and $Q_H(t)$ represents a flow rate ($\ell$/sec) of the heated hot water depending on the time elapsed from the use start time of the faucet 3.

In Equation 3, the target temperature $T_T$ of the discharge water is basically determined based on the total amount of the remaining hot water and the capacity of the heating tank 150, and preferably determined as a temperature (e.g., a range of 38° C. to 42° C.) higher than a body temperature of a person. Meanwhile, the temperature $T_H(0)$ of the heated hot water is equal to the target heating temperature of the hot water at the use start time of the faucet 3, and the temperature $T_H(t_a)$ of the heated hot water should be at least higher than or equal to the target temperature of the discharge water at a time $t_a$ when the temperature of the remaining hot water becomes equal to the target temperature of the discharge water. The temperature $T_W(t)$ of the remaining hot water depending on the time elapsed from the use start time of the faucet 3 is maintained without a large difference (e.g., ±3° C.) for a predetermined time from the use start time (t=0) of the faucet (e.g., ⅓ to ¾ of a time required up to reaching the target temperature of the discharge water from the use start time of the faucet), and increases up to the maximum supply temperature of the hot water. In this case, when the temperature of the remaining hot water rapidly increases (e.g., ⅓ $T_N$), the temperature of the remaining hot water tends to rapidly increase, and then slowly increase up to the maximum supply temperature. Unlike this, when the temperature of the remaining hot water slowly increases (e.g., ¾ $T_N$), the temperature of the remaining hot water tends to increase linearly up to the maximum supply temperature.

Further, in Equation 3, the flow rate $Q_H(t)$ of the heated hot water depending on the time elapsed from the use start time of the faucet 3 may be obtained from the following equation, which is acquired by modifying Equation 2:

$$Q_H(t)\frac{T_O(t) - Q_O(t) - T_W(t)Q_O(t)}{T_H(t) - T_W(t)} \quad \text{[Equation 4]}$$

wherein, $Q_H(t)$ represents a supply water amount of the heated hot water depending on the time elapsed from the use start time of the faucet 3, $T_O(t)$ represents the temperature of the discharge water depending on the time elapsed from the use start time of the faucet 3, $T_H(t)$ represents the temperature of the heated hot water depending on the time elapsed from the use start time of the faucet 3, $T_W(t)$ represents the temperature of the remaining hot water depending on the time elapsed from the use start time of the faucet 3, and $Q_O(t)$ represents the water amount depending on the time elapsed from the use start time of the faucet 3.

In Equation 4, the temperature $T_O(t)$ of the discharge water is equal to the target temperature $T_T$ of the discharge water, which is a value fixed regardless of the elapse of the time. Further, the water amount $Q_O(t)$ of the discharge water depending on the time elapsed from the use start time of the faucet 3 is a value measured by the flow rate sensor 160. In addition, the temperature $T_H(t)$ of the heated hot water, the temperature $T_W(t)$ of the remaining hot water, and the temperature $T_O(t)$ of the discharge water depending on the time elapsed from the use start time of the faucet 3 are values measured by the third temperature sensor 120*c*, the first temperature sensor 120*a*, and the fourth temperature sensor 120*d*, respectively.

Accordingly, the controller 170 may identify the supply water amount of the heated hot water depending on the time elapsed from the use start time of the faucet 3 by using Equation 4, and calculate a total amount of heated hot water used from the use start time of the faucet 3 to a time when the temperature $T_W(t)$ of the remaining hot water becomes equal to the target temperature $T_T$ of the discharge water based on the identified supply water amount.

Next, the controller 170 compares a target heating temperature $T_{H,\ target}$ of the hot water in the heating tank 150, and a current temperature $T_{H,\ cur}$ of the hot water in the heating tank 150 measured by the third temperature sensor 120*c* (S1220). When the current temperature $T_{H,\ cur}$ of the hot water in the heating tank 150 is lower than the target heating temperature $T_{H,\ target}$ of the hot water in the heating tank 150, the controller 170 turns on the heater 155 (S1230). Unlike this, when the current temperature $T_{H,\ cur}$ of the hot water in the heating tank 150 is higher than or equal to the target heating temperature $T_{H,\ target}$ of the hot water in the heating tank 150, the controller 170 turns off the heater 155 (S1240). After driving the heater 155, the controller 170 compares the current temperature $T_{H,\ cur}$, of the hot water in the heating tank 150 measured by the third temperature sensor 120*c*, and a maximum heating temperature $T_{H,\ max}$ of the hot water (S1250). When the current temperature $T_{H,\ cur}$ of the hot water in the heating tank 150 is lower than the maximum heating temperature $T_{H,\ max}$ of the hot water, the controller 170 maintains the heater 155 in the turn-on state, and then repeatedly performs step S1250. Unlike this, when the current temperature $T_{H,\ cur}$ of the hot water in the heating tank 150 reaches the maximum heating temperature $T_{H,\ max}$ of the hot water, the controller 170 turns off the heater 155 (S1240). Meanwhile, in step S1200, the controller 170 determines that the faucet 3 is being used when the measurement value input from the flow rate sensor 160 is larger than 0 to start controlling the electronic valve 140.

By the method described above, the controller 170 appropriately controls whether to drive the heater 155 installed in the heating tank 150 while the faucet 3 is not used, thereby stably supplying the hot water while minimizing the power consumption when subsequent user uses the faucet 3.

Meanwhile, as described with reference to FIGS. 11 and 12, when the device 100 for controlling a faucet according to the present invention is not used, the temperature of the hot water in the heating tank 150 is controlled by appropriately turning on/off the heater 155 based on the measurement values of the first temperature sensor 120*a* and the third temperature sensor 120*c* measured at a predetermined time interval, thereby providing the discharge water of the temperature desired by the user immediately when the user uses the faucet 3. However, in a situation in which the temperature of the remaining hot water in the hot water pipe 1 is excessively lowered, a situation in which the water amount of the remaining hot water in the hot water pipe 1 is larger than the capacity of the heating tank 150 at a place where the device 100 for controlling a faucet according to the present invention is installed, etc., the temperature of the hot water which may be provided by the device 100 for controlling a faucet according to the present invention until the remaining hot water in the hot water pipe 1 is fully exhausted may be lower than the temperature of the discharge water desired by the user. In this case, the controller 170 may guarantee the temperature of the discharge water desired by the user by heating the hot water in the heating tank 150 by operating the heater 155 even when the faucet 1 is being used.

When the capacity of the heating tank 150 is 2 ℓ, the total amount of the remaining hot water is 4 ℓ, the capacity of the heater 155 is 1 kW, the flow rate of the discharge water set by the user is 100 mℓ/s, the temperature of the hot water supplied through the hot water pipe is 20° C., and the temperature of the discharge water desired by the user is 40° C., a case where the temperature of the hot water in the heating tank 150 is 50° C. is described as an example. In this case, when a time required until the temperature of the remaining hot water reaches the temperature of the discharge water desired by the user is 35 seconds, a total amount of the remaining hot water used until 35 seconds elapsed from the use start time of the faucet 3 becomes 3.5 ℓ. In addition, it is assumed a case where the temperature of the remaining hot water is maintained at 20° C. until 25 seconds elapsed from the use start time of the faucet 3, and then the temperature increases linearly up to 40° C. for 10 seconds, and the temperature of the heated hot water is maintained at 50° C. until 35 seconds elapsed from the use start time of the faucet 3. In this case, the electronic valve 140 continuously changes a mixing ratio of the heated hot water and the remaining hot water in order to provide the discharge water at the temperature desired by the user, and a total amount of the heated hot water required until 35 seconds elapses from the use start time of the faucet 3 calculated by Equation 4 based on the changed mixing ratio is approximately 2.1 ℓ. Accordingly, there is a problem in that even though the cold water is blocked by controlling the electronic valve 140, and 100% of hot water in which the heated hot water and the remaining hot water are mixed is supplied to the faucet 3, hot water at a temperature lower than 40° C. which is the temperature of the discharge water desired by the user is supplied. In this case, when the heater 155 of having the capacity of 1 kW is driven while the faucet is being used, the hot water in the heating tank 150 may be raised by approximately 4° C., and accordingly, the hot water of 40° C. desired by the user may be continuously supplied.

As described above, the determination on whether to drive the heater 155 in a situation in which the device 100 for controlling a faucet according to the present invention is being used is made by the capacity of the remaining hot water in the hot water pipe 1 (i.e., a capacity of cooled hot water which remains in the hot water pipe 1 until hot water of a supply temperature is supplied from a point branched to each house from a central pipe when hot water is supplied by a District Heating Corporation, and a hot water discharge point of a boiler installed in the house), the temperature of the remaining hot water, the capacity of the heating tank 150, the capacity of the heater 155, the flow rate of the discharge water desired by the user, the temperature of the discharge desired by the user, etc. When determined that the temperature of the discharge water desired by the user may not be guaranteed in spite of driving the heater 155 in the situation in which the device 100 for controlling a faucet according to the present invention is being used, it is preferable that the controller 170 drives the heater 155, and at the same time, sets the temperature of the discharge water to be lower than the temperature of the discharge water desired by the user based on the temperature and the water amount of the remaining hot water, the capacity of the heating tank 150 and the temperature of the hot water in the heating tank 150, the flow rate of the discharge water desired by the user, the capacity of the heater 155, etc., and supply the discharge water to the faucet 3.

Meanwhile, in the embodiment described with reference to FIG. 1, since the heating tank 150 is sealed with respect to the hot water pipe 1 and the electronic valve 140, a volume is expanded as the water in the heating tank 150 is heated, so excessively large pressure is applied to the heating tank 150. Since this may cause the damage to the device, the pressure needs to be decreased to an appropriate level (e.g., 1.5 times of supply water pressure of the hot water) or less. To this end, the controller 170 may also perform a pressure alleviation operation based on the value measured by the third temperature sensor 120*c* installed in the heating tank 150. In this case, the controller 170 controls the electronic valve 140 to a location where the heated hot water of the heating tank 150 and the cold water of the cold water pipe 2 are mixed instantaneously whenever the temperature of the water in the heating tank 150 measured by the third temperature sensor 120*c* installed in the heating tank 150 increases by a predetermined reference temperature (e.g., 10° C.), and then controls the electronic valve 140 to a location where the heated hot water of the heating tank 150 is not discharged. As a result, the heated hot water flows to the cold water pipe, so the pressure in the heating tank 150 is released. Such an operation may be performed when a pressure increase amount (e.g., the pressure in the heating tank 150) corresponding to a temperature rising amount of the water in the heating tank 150 measured by the third temperature sensor 120*c* installed in the heating tank 150 is higher than or equal to a first reference pressure (e.g., 5 bar). A pressure alleviation operation by the controller 170 is continuously performed after the device 100 for controlling a faucet according to the present invention is installed regardless of the use of the faucet 3 by the user.

Unlike this, a pressure release operation for the heating tank 150 may also be performed based on a pressure value measured by a pressure sensor (not illustrated) mounted on the heating tank 150. In this case, when the pressure in the heating tank 150 measured by the pressure sensor is higher than or equal to the first reference pressure (e.g., 5 bar), the controller 170 controls the electronic valve 140 to allow the heated hot water to flow to the cold water pipe 1. In addition, when the pressure in the heating tank 150 reaches a second reference pressure (e.g., 2 bar), the controller 170 controls the electronic valve 140 to block the discharge of the heated hot water to the cold water pipe 2.

In the above description, the temperature of the remaining hot water in the hot water pipe 1 is equal to the temperature of the remaining hot water measured by the first temperature sensor 120*a* installed in the hot water connection pipe 1*a*. Further, the present invention has been described with reference to the embodiments. However, it will be appreciated by those skilled in the art that various modifications and changes can be made to the present invention without departing from the spirit and the scope of the present invention as set forth in the claims below.

The invention claimed is:

1. A device for controlling a faucet, comprising:

an input unit configured to receive a desired temperature of discharged water from a user;

a first temperature sensor and a second temperature sensor configured to measure temperatures of hot water and cold water supplied from a hot water pipe and a cold water pipe, respectively;

a heating tank including a heater provided therein, the heating tank configured to heat the hot water supplied from the hot water pipe by the heater, store the heated hot water, and supply the heated hot water;

a third temperature sensor configured to measure a temperature of water in the heating tank;

an electronic valve including a plurality of inlets connected respectively to the heating tank, the hot water pipe and the cold water pipe, the electronic valve configured to select two among the heated hot water, the hot water, and the cold water as mixture target supply water and to adjust a mixing ratio thereof, and to discharge the discharged water at the desired temperature input from the user through a discharge pipe;

a fourth temperature sensor configured to measure the temperature of the discharged water discharged from the electronic valve;

a flow rate sensor configured to measure a flow rate of the discharged water discharged through the discharge pipe of the electronic valve; and a controller operatively connected to the input unit, the temperature sensors, the heater, and the electronic valve, the controller being configured to control operation of the heater based on the temperature of the heated water, and to control the electronic valve based on the desired temperature received from the user unit and the temperature of the discharged water such that a difference between the temperature of the discharged water and the desired temperature is maintained within a predetermined range, wherein the control of the electronic valve includes repeatedly adjusting the mixing ratio of the selected mixture target supply water based on the temperature of the discharged water measured by the fourth temperature sensor and the desired temperature, or reselecting the mixture target supply water and adjusting a mixing ratio thereof.

2. The device for controlling the faucet of claim 1, comprising:

a second electronic valve configured to selectively direct the discharged water input from the discharge pipe to one of at least two outflow pipes under control of the controller.

3. The device for controlling the faucet of claim 1, wherein the electronic valve includes:

a motor configured to rotate in response to a control signal input from the controller; and a cartridge, wherein the cartridge includes:

a rotational shaft rotatably connected to a driving shaft of the motor;

a first inflow pipe connected to the hot water pipe, and input with the hot water;

a second inflow pipe connected to the heating tank and input with the heated hot water;

a third inflow pipe connected to the cold water pipe and input with the cold water;

a rotation plate rotatably connected to the rotational shaft and having a plurality of through-holes; and the discharge pipe discharging the discharged water, wherein the cartridge is configured to mix mixture target supply water supplied from two inflow pipes selected among the first inflow pipe, the second inflow pipe, and the third inflow pipe based on a rotational position of the rotation plate, and to discharge the discharged water through the discharge pipe.

4. The device for controlling the faucet of claim 3, wherein the controller is configured to control the electronic valve such that:

the electronic valve is rotated by a first rotation amount when a difference between the temperature of the discharged water measured by the fourth temperature sensor and the desired temperature set by the user is greater than or equal to a first reference temperature;

the electronic valve is rotated by a second rotation amount, smaller than the first rotation amount when the difference is less than the first reference temperature and greater than or equal to a second reference temperature; and the electronic valve is rotated by a third rotation amount, smaller than the second rotation amount, when the difference is less than the second reference temperature and greater than or equal to a third reference temperature, and wherein when the temperature of the discharged water is higher than the desired temperature set by the user, the electronic valve is controlled to be rotated in a direction that increase a proportion of lower temperature water, and when the temperature of the discharged water is lower than the desired temperature set by the user, the electronic valve is controlled to be rotated in a direction that increases a proportion of higher temperature water.

5. The device for controlling the faucet of claim 4, wherein the cartridge is configured to mix mixture target supply water supplied from two inflow pipes selected from among the first inflow pipe, the second inflow pipe, and the third inflow pipe based on a rotational position of the rotation plate, and to discharge the discharged water through the discharge pipe, wherein the two inflow pipes include:

(i) the first inflow pipe and the second inflow pipe, or (ii) the second inflow pipe and the third inflow pipe.

6. The device for controlling the faucet of claim 4, wherein the cartridge is configured to mix mixture target supply water supplied from two inflow pipes selected from among the first inflow pipe, the second inflow pipe, and the third inflow pipe based a rotational position of the rotation plate, and to discharge the discharged water through the discharge pipe, wherein the two inflow pipes include:

(i) the first inflow pipe and the second inflow pipe, or (ii) the first inflow pipe and the third inflow pipe.

7. The device for controlling the faucet of claim 1, wherein the controller is configured to determine a target heating temperature for water in the heating tank based on measurements of the first temperature sensor and the third temperature sensor, and to drive the heater such that a temperature of water in the heating tank reaches the target heating temperature.

8. The device for controlling the faucet of claim 7, wherein the target heating temperature is less than or equal to a maximum heating temperature set for water in the heating tank.

9. The device for controlling the faucet of claim 7, wherein the controller is configured to determine the target heating temperature of water in the heating tank and to drive the heater based on the measurements of the first temperature sensor and the third temperature sensor at a predetermined time interval.

10. The device for controlling the faucet of claim 1, wherein the input unit is a communication module configured to receive the desired temperature of the discharged water from a user hand-held terminal device via a communication network.

11. The device for controlling the faucet of claim 1, further comprising:

a display device configured to selectively output a desired temperature of the discharge water set by the via the user input unit and the desired temperature of the discharge water measured by the fourth temperature sensor; and a motion detection sensor configured to detect the user's movement, wherein the controller turns the display device ON when the user is detected by the motion detection sensor, and turns the display device OFF when the user is not detected by the motion detection sensor, and wherein, after the display device is turned ON, the controller maintains the display device in the ON state upon detection of a flow of the discharge water measured by the flow rate sensor, even in the absence of user detection by the motion detection sensor.

* * * * *